(12) United States Patent
Vilain et al.

(10) Patent No.: US 8,987,668 B2
(45) Date of Patent: Mar. 24, 2015

(54) BOLOMETRIC DETECTOR WITH A TEMPERATURE-ADAPTIVE BIASING

(71) Applicant: ULIS, Veurey Voroize (FR)

(72) Inventors: Michel Vilain, Saint-Georges de Commiers (FR); Patrick Robert, Reaumont (FR)

(73) Assignee: ULIS (FR)

( * ) Notice: Subject to any disclaimer, the term of this patent is extended or adjusted under 35 U.S.C. 154(b) by 0 days.

(21) Appl. No.: 14/182,927

(22) Filed: Feb. 18, 2014

(65) Prior Publication Data

US 2014/0239180 A1    Aug. 28, 2014

(30) Foreign Application Priority Data

Feb. 22, 2013   (FR) ...................................... 13 51583

(51) Int. Cl.
| | |
|---|---|
| G01J 5/00 | (2006.01) |
| H01L 25/00 | (2006.01) |
| G01T 5/00 | (2006.01) |
| G01J 5/20 | (2006.01) |
| G01J 5/22 | (2006.01) |

(52) U.S. Cl.
CPC ..... *G01J 5/20* (2013.01); *G01J 5/22* (2013.01)
USPC ...................... 250/338.1; 250/332; 250/473.1

(58) Field of Classification Search
CPC ...................................... G01J 5/20; G01J 5/22
USPC ............................................... 250/473.1, 332
See application file for complete search history.

(56) References Cited

U.S. PATENT DOCUMENTS

| | | |
|---|---|---|
| 5,756,999 A | 5/1998 | Parrish et al. |
| 6,028,309 A | 2/2000 | Parrish et al. |
| 6,433,333 B1 | 8/2002 | Howard |
| 6,690,013 B2 | 2/2004 | McManus |
| 7,417,230 B2 | 8/2008 | Anderson et al. |
| 2009/0014653 A1* | 1/2009 | Parrish ....................... 250/338.1 |

FOREIGN PATENT DOCUMENTS

| | | |
|---|---|---|
| WO | 9835212 A1 | 8/1998 |
| WO | 2007106018 A1 | 9/2007 |

OTHER PUBLICATIONS

Mottin, et al.; "Uncooled amorphous silicon technology enhancement for 25-μm pixel pitch achievement", Jan. 23, 2003; pp. 200-207; This paper was published in SPIE Proceedings vol. 4820.

* cited by examiner

*Primary Examiner* — David J Makiya
*Assistant Examiner* — Kenneth J Malkowski
(74) *Attorney, Agent, or Firm* — St. Onge Steward Johnston & Reens LLC

(57) ABSTRACT

An infrared detector including an array of detection bolometers each having a bolometric membrane suspended above a substrate, and associated with each bolometer: a detection branch, including the bolometer and a circuit performing a biasing according to a voltage set point, a compensation branch, including a compensation bolometer thermalized to the substrate, a circuit performing a biasing according to a voltage set point, an integrator for generating a voltage by integrating a difference between the currents flowing through said branches, a circuit generating a quantity depending on substrate temperature, including: a bolometer thermalized to the substrate, and a circuit for biasing the bolometer, and a circuit for generating the voltage set points according to said quantity. When the array is exposed to a uniform reference scene, the average of the differences between currents flowing through said branches is within the integrator dynamic range for a substrate temperature range from −30° C.-90° C.

20 Claims, 7 Drawing Sheets

Fig. 1 (State of the art)

(State of the art)

BOLOMETRIC DETECTOR WITH A TEMPERATURE-ADAPTIVE BIASING

FIELD OF THE INVENTION

The present disclosure relates to the field of bolometric infrared imaging and pyrometry. More specifically, the invention relates to bolometric infrared detectors comprising an array of bolometers formed of membranes suspended above a substrate.

BACKGROUND OF THE INVENTION

In the field of so-called "thermal" infrared detectors, it is known to use one-dimensional or two-dimensional arrays of elements sensitive to infrared radiation, capable of operating at ambient temperature.

A thermal infrared detector conventionally uses the variation of a physical quantity of a so-called "thermometric" or "bolometric" material, according to its temperature. Most currently, this physical quantity is the electric resistivity of said material, which is strongly temperature-dependent. The unit sensitive elements of the detector, or "bolometers", are usually in the form of membranes, each comprising a layer of thermometric material, and suspended above a substrate, generally made of silicon, via support arms having a high thermal resistance, the array of suspended membranes being usually called "retina".

Such membranes especially implement an incident radiation absorption function, a function of conversion of the power of the absorbed radiation into heat power, and a thermometric function of conversion of the generated heat power into a variation of the resistivity of the thermometric material, such functions being implementable by one or a plurality of distinct elements.

Further, the support arms of the membranes are also conductive and connected to the thermometric layer of said membranes, and means for sequentially addressing and biasing the thermometric elements of the membranes and means for forming electric signals usable in video formats are usually formed in the substrate having the membranes suspended thereabove. The substrate and the integrated means are commonly called "read circuit".

The read circuit and the sensitive retina of a detector are usually integrated in a sealed package under very low pressure, provided with a window transparent to the radiation of interest, usually having a wavelength in the range from 8 to 14 micrometers. This range corresponds to the transparency window of the atmosphere and to the majority of the radiations originating from scenes in the vicinity of 300 K. To obtain a thermal or pyrometric image via such a detector, the scene is focused through an adapted optical system onto the focal plane having the retina arranged thereon, and clocked electric stimuli are applied via the read circuit to each of the bolometers, or to each row of such bolometers, to obtain a "video" electric signal forming the image or measurement of the temperature reached by each of said elementary detectors. The signal may be shaped in more or less elaborate fashion, directly by the read circuit, and then transmitted in analog or digital form to an electronic system external to the package. This electronic system typically applies various corrections to each video frame delivered by the detector, in particular a correction of spatial offset and gain dispersions (called "NUC" for Non Uniformity Corrections), to generate a thermal or pyrometric image capable of being displayed, or more generally for the use of the signals thus formed from the observed scene.

Such a detector has many advantages in terms of manufacturing cost and of use, but also disadvantages which may limit its performance in the absence of specific precautions.

More specifically, a problem of drift of the average signal at the output of the bolometers is posed when the substrate temperature varies afterwards, in particular, changes of external conditions, which are essentially reflected by thermal conduction through the integrated system elements all the way to the substrate level, which defines the average temperature of the sensitive membranes. Now, it is well known that the sensitivity of bolometers to a 1° C. variation, for example, of the substrate temperature, is typically from fifty to one hundred times greater than their sensitivity to a 1° C. temperature variation of the observed scene. As a result, in the absence of specific precautions, the useful signal relative to the scene is drowned in this background component deprived of any interest.

To avoid this defect, bolometric detectors operating at ambient temperature have been, since the origin of their industrial development, fitted with a substrate temperature stabilization module, usually a Peltier module (TEC, "Thermo Electric Cooler"). A resistive element regulated by Joule effect in thermal continuity with the substrate also provides a satisfactory temperature stability, although with no active cooling capacity. Such means however make the component more complex and expensive and imply an electric power consumption which is all the higher as the ambient temperature is distant from the selected stabilization temperature. However, the manufacturing cost of such bolometric detectors and the electric power consumption of the system which implements them are precisely the major issue of such detectors.

Actually, the tendency is to do without thermal stabilization systems, and the problem of the adverse effect of substrate temperature variations on the signal stability thus has to be addressed. The solution generally implemented is to arrange, in the electronic circuit for forming the signal in relation with the temperature of the imaging bolometers (called this way since they are sensitive to the incident electromagnetic radiation), an element for compensating the focal plane temperature (FPT), itself bolometric, that is, having its electric behavior following the substrate temperature, but remaining essentially insensitive to radiation. This result is for example obtained by means of bolometric structures provided, by construction, with a lower thermal resistance towards the substrate, and/or by masking these structures behind a shield opaque to thermal radiation.

The use of such compensation elements further has the advantage of eliminating most of the so-called common-mode current originating from imaging (also called "active") bolometers.

Further, a thermal resolution (smallest temperature gap separable from the background level on the scene) typically smaller than 50 mK (milliKelvin) is required. The laws of radiation and optics provide an attenuation factor of this temperature difference in the range from 50 to 100 between the scene and the membrane of an elementary bolometer. The sensitive elements usually have a temperature coefficient of resistance (TCR) in the order of −2% per degree; these various scale factors result in the need to discriminate a relative variation of resistance smaller than $2 \cdot 10^{-5}$ (20 ppm).

Admitting a resistance read mode at constant bias voltage, minute variations of the current which crosses each bolometric resistor thus have to be discriminated. To achieve this, it is necessary to eliminate most of the so-called common-mode signal independent from the scene, to efficiently depict the spatial and time variations in relation with the observed scene, and this within the available electric dynamic range of the read circuit.

FIG. 1 is an electric diagram of a bolometric detector 10 with no temperature regulation, or "TECless" detector, of the state of the art, comprising a common-mode compensation structure, and FIG. 2 is an electric diagram of a circuit used to form a read signal of a bolometer of the common-mode compensated detector. Such a detector is for example described in document: "*Uncooled amorphous silicon technology enhancement for 25 μm pixel pitch achievement*"; E. Mottin et al, Infrared Technology and Application XXVIII, SPIE, vol. 4820E.

Detector 10 comprises a two-dimensional array 12 of identical unit bolometric detection elements 14, or "pixels", each comprising a sensitive resistive bolometer 16 in the form of a membrane suspended above a substrate, such as previously described, and of electric resistance $R_{ac}$. Each bolometer 16 is connected at one of its terminals to a constant voltage VDET, especially the ground of detector 10, and at its other terminal to a biasing MOS transistor 18 operating in saturated state, for example an NMOS transistor, setting voltage $V_{ac}$ across bolometer 16 by means of a gate control voltage GAC. If A designates the node corresponding to the source of MOS 18 and if VA is the voltage at this node, which depends on gate voltage GAC, voltage $V_{ac}$ is then equal to $V_{ac}$=VA−VDET. Pixel 14 also comprises a selection switch 20, connected between MOS transistor 18 and a node S provided for each column of array 12, and driven by a control signal Select, enabling to select bolometer 16 for the reading thereof. Transistor 18 and switch 20 are usually formed in the substrate in the footprint of the membrane of bolometer 16. Elements 16 and 18 form a so-called detection branch. Particularly, since the pixels are identical and voltage VDET, on the one hand, and voltage GAC, on the other hand, are identical for all pixels, bolometers 16 are thus voltage-biased under the same voltage $V_{ac}$. Further, gate voltage GAC being constant, voltage $V_{ac}$ is thus also constant.

Detector 10 also comprises, at the foot of each column of array 12, a compensation structure 22, also usually called "skimming" structure. As previously described, the value of the electric resistance of detection bolometers 16 is greatly dictated by the substrate temperature. The current flowing through a detection bolometer 16 thus comprises a significant component which depends on the substrate temperature and is independent from the observed scene. Compensation structure 22 has the function of delivering an electric current for purposes of partial or total compensation of this component. In the meaning of the invention, the current component of detection bolometers 16 dictated by the substrate temperature is designated as the "common-mode detection current". The current generated by compensation structure 22 for purposes of compensation of the common-mode detection current is called "common-mode compensation current".

Structure 22 comprises a compensation bolometer 24, of electric resistance $R_{cm}$, made insensitive to the incident radiation originating from the scene to be observed. Bolometer 24 is constructed by means of the same thermometric material as bolometer 16, but has a low thermal resistance towards the substrate. For example, the resistive elements of compensation bolometer 24 are directly formed in contact with the substrate, or bolometer 24 comprises a membrane similar to that of detection bolometers 16 suspended above the substrate by means of structures having a very low thermal resistance, or also compensation bolometer 24 comprises a membrane and support arms substantially identical to those of detection bolometers 16 and a material which is a good thermal conductor fills the space between the membrane of bolometer 24 and the substrate. The electric resistance of bolometer 24 is thus essentially dictated by the substrate temperature, bolometer 24 then being said to be "thermalized" to the substrate.

Bolometer 24 is connected at one of its terminals to a constant voltage VSK, and compensation structure 22 comprises at least one biasing MOS transistor 26 operating in saturated state, of a polarity opposite to that of transistors 18 of detection pixels 14, for example a PMOS transistor, setting voltage $V_{cm}$ across bolometer 24 by means of a gate control voltage GCM and connected between the other terminal of compensation bolometer 24 and node S. Calling B the node corresponding to the drain of MOS transistor 26 and VB the voltage at this node, voltage $V_{cm}$ is then equal to $V_{cm}$=VSK−VB. Elements 24 and 26 form a so-called compensation branch common to each column.

The value of the common-mode compensation current is defined by the value of resistance $R_{cm}$ of bolometer 24 and of the biasing parameters thereof.

According to a first variation, resistance $R_{cm}$ is selected to be substantially identical to that of detection bolometers 16 and the bias voltage of compensation bolometers 24 is selected to be close to that of the detection bolometers, to obtain a common-mode compensation current close to the common-mode detection current. However, it should be noted that it is not necessary to adjust, on design thereof, resistance $R_{cm}$ of the bolometer 24 to a value close to that of detection bolometers 16, since the current that it conducts should just be adjusted to a value close to that flowing through the detection branch during the reading.

According to a second variation, this result is also obtained by means of a resistance of compensation bolometer 24 smaller than that of detection bolometers 16, and of a bias voltage $V_{cm}$ smaller by roughly the same proportion.

The second variation is usually preferred since it enables to more efficiently distribute the bias amplitude VSK−VDET available on the bolometric bridge, characteristic of the CMOS technology implemented to manufacture the read circuit. Indeed, it is usually advantageous to further bias the active bolometer to the detriment of the biasing of the compensation bolometer, that is, to impose $V_{ac}$>$V_{cm}$ in order to obtain an optimal sensitivity of the detector.

Detector 10 also comprises, at the foot of each column of array 12, an integrator 28 of CTIA type ("Capacitive TransImpedance Amplifier") for example comprising an operational amplifier 30 and a capacitor 32 connected between the inverting input and the output of amplifier 30. Its inverting terminal and its non-inverting terminal are further respectively connected to node S and to a constant voltage VBUS. Voltage VBUS thus forms a reference for the output signals, and is in the range from VDET to VSK. A switch 34, driven by a signal Reset is also provided in parallel with capacitor 32, for the discharge thereof. The outputs of CTIAs 28 are eventually for example connected to respective sample-and-hold circuits 36 for the delivery of voltages Vout of CTIAs in multiplexed mode by means of a multiplexer 38 towards one or a plurality of series output amplifier(s) 40. It may also be integrated at the output of the digitizing means by analog-to-digital converters (ADC).

Finally, detector 10 comprises a sequencing unit 42 controlling the different previously-described switches. In operation, array 12 is read line by line. To read a line of array 12, switches 20 of the line of pixels 14 are turned on and switches 20 of the other lines are turned off.

After a phase of discharge of the capacitors of the CTIA integrators at the foot of the columns, achieved by closing switches 34 by means of signal Reset, followed by their opening, a circuit such as shown in FIG. 2 is thus obtained for each pixel of the line being read. A current $I_{ac}$ flows through detection bolometer 16 of the pixel under the effect of its voltage biasing by MOS transistor 18, and a current $I_{cm}$ flows through compensation bolometer 24 of the compensation structure under the effect of its voltage biasing by MOS transistor 26. These currents are subtracted from each other at node S, and the resulting current difference is integrated by CTIA 28 during a predetermined integration period $T_{int}$. Output voltage Vout of CTIA 28 thus is a measurement of the variation of the resistance of detection bolometer 16 caused by the incident radiation to be detected since the non-useful part of current $I_{ac}$ depending on the substrate temperature is at least partly compensated by current $I_{cm}$ specifically generated to reproduce this non-useful part.

Usually, the bias voltages of detection and compensation bolometers 16 and 24 are adjusted by means of transistors 18 and 26 to position output signal Vout in electric dynamic range $D_{el}$ of integrator 28, at a given reference temperature, usually an average reference temperature with respect to the operational temperature range of the detector, particularly a reference temperature close to 300° K. When the ambient temperature of detector 10 varies, the substrate temperature also varies due to the absence of thermal regulation, and the temperature of detection bolometers 16 thus also varies. However, compensation bolometers 24 being thermalized to the substrate, they are also submitted to a temperature variation resulting from the temperature variation of the substrate. The current flowing through the detection and compensation bolometers thus naturally compensate for each other at the first order when the ambient temperature of the detector, and thus that of the substrate, changes. A substantial rejection of the substrate temperature, also called "focal plane temperature" (FPT), is thus obtained.

If, ideally, a perfect rejection is obtained whatever the substrate temperature, in practice, limitations appear when the variations, particularly positive, relative to the reference temperature exceed a few tens of degrees.

More specifically, bias voltages $V_{ac}$ and $V_{cm}$ of detection and compensation bolometers 16 and 24 are set so that the average of the output voltages of the detector when the latter is exposed to a uniform scene having a temperature equal to the reference temperature, or "reference scene", is positioned in the electric dynamic range of integrator 28 at a specific position, considered optimal, of this dynamic range. The output voltages in front of a uniform scene are usually called "continuous levels" and the spatial average of these voltages is usually called "average continuous level".

When the detector is in service, that is observes a scene of any kind, for a substrate temperature close to the reference temperature, output voltages Vout of the detector exposed to the scene to be observed thus differs from the average continuous level, particularly due to the heating of the bolometers under the effect of the incident radiation originating from the observed scene and to intrinsic dispersions of the characteristics of bolometers 16. The average continuous level is thus set "in factory" (before putting into service) in the read dynamic range so that the output voltage differences relative to the average continuous level are in the read dynamic range for the widest possible range of observation conditions usually encountered on use of the detector. Usually, the average level is thus not centered in the read dynamic range but rather positioned, for the proposed polarity of the circuit, in the lower third of the dynamic range, to promote the observation of points hotter than the temperature of the ambient background.

Further, as previously mentioned, the compensation bolometers are provided to compensate the common-mode current flowing through the detection bolometers for as wide a focal plane temperature range as possible. In the ideal case where the temperature compensation is perfect, the average continuous level, when the detector observes a scene in the vicinity of the focal plane temperature, thus does not vary along with the temperature and remains ideally positioned in the read dynamic range.

Now, it can be observed that this average level nevertheless varies along with the substrate temperature, and this, by significant proportions. Further, detection bolometers 16 have an intrinsic dispersion of their characteristics, particularly a so-called "offset" dispersion characterized by different detector output voltages in front of a uniform scene, which varies according to the substrate temperature.

Such variations result in a saturation of integrators 28 for a significant proportion of detection bolometers 16 beyond a specific temperature of the substrate. Beyond this temperature, the detector scene dynamic range thus becomes zero. Indeed, scene dynamic range $D_{sc}$, which is an essential quantity of the detector, is defined by the amplitude of the temperature variation of any point in a scene, which forms a signal usable at the output, that is, in the electric dynamic range of the detector.

Thus, the previously-indicated phenomena limit the operating temperature range of the detector. To properly understand these limitations, the various involved phenomena have to be developed.

The inventors have observed that the variation of the average continuous level along with the variation, and more particularly the rise, of the substrate temperature, is in particular connected to the phenomenon of "self-heating" of detection bolometers 16 by Joule effect under the effect of the read biasing. Indeed, frame frequency $f_r$, that is, the number of full images formed per second, usually is 30, 50, or 60 Hz, which results in a recurrence in the addressing of detection bolometers 16 from 16 to 32 ms. For each recurrence, a Joule power $P_J$ equal at the first order to $V_{ac}^2/R_{ac}$ is dissipated in bolometers 16, which causes a heating during each period $T_{int}$ equal to $T_{int} \cdot P_J/C_{th}$, where $C_{th}$ is the heat capacity of bolometer 16. The usual quantities of the field result in a heating of bolometer 16 in the order of some ten degrees at the end of each read pulse.

Now, the thermal time constant of bolometers 16 is typically in the range from 8 to 20 ms. As a result, detection bolometers 16 do not have time to cool down and to find a equilibrium temperature close to that of the substrate before being submitted to a new biasing. Thus, the average dynamic equilibrium temperature of the membrane of a bolometer 16 is usually substantially higher by a quantity $\Delta T$ of a plurality of degrees than the substrate temperature at which compensation bolometers 24 are maintained. Due to the fact that this difference is proportional to $P_J$, and thus to $1/R_{ac}$, and that resistance $R_{ac}$ of the bolometers decreases along with temperature by approximately 2% per degree for usual thermometric materials with a negative temperature coefficient, the average temperature rise $\Delta T$ between detection bolometers 16 and the substrate (compensation bolometers 24) increases along with the substrate temperature.

Accordingly, detection and compensation bolometers 16 and 24 follow resistance curves R(FPT) which progressively move apart when the substrate temperature deviates from the reference temperature.

Finally, quantity $(I_{ac}(t)-I_{cm}(t))$ which defines the average continuous level after integration over time $T_{int}$ by the CTIAs, thus regularly increases as the substrate temperature varies beyond the reference temperature. This is the main origin of the displacement of the average continuous level according to the substrate temperature such as shown in curve "state of the art NC" of FIG. 6.

Another source of variation of average continuous level NC with the substrate temperature is linked to the respective nature and geometries of the electronic biasing elements, usually formed of MOS transistors. Indeed, due to the necessary balancing of the voltages available in the two bolometric detection and compensation branches, the voltage across detection bolometer 16 is controlled by an NMOS transistor, and the voltage across compensation bolometer 24 is controlled by a PMOS transistor, or conversely. Such transistors, in addition to being of opposite type, each have specific geometries, particularly in terms of channel width and length, determined as a priority according to contradictory constraints of geometric bulk and electronic noise limitation. As a result, the respective temperature behavior of such transistors, in terms of resulting current respectively in the two bolometric branches, that is, in terms of drift of the average NC according to the substrate temperature, is ordinary far from ideal.

As a result of such phenomena, which have been non-exhaustively discussed, the average NC crosses one or the other limit of the electric output dynamic range of integrator 28, which entails a general saturation of the signal, as soon as the ambient temperature exceeds a few tens of degrees beyond the reference temperature used for the initial pre-setting of the bias voltages. Thereby, the various differential contributions in each branch limit the observable scene dynamic range $D_{sc}$, without even considering spatially-dispersive phenomena.

Another limitation has to do with the natural dispersion of the values of the bolometric detection and compensation resistances. Indeed, raw signal Vout in front of a scene at uniform temperature distributes according to a distribution resulting from the natural combined dispersion of the detection and compensation resistances.

For example, a distribution of resistances $R_{ac}$ of detection bolometers 16, though excellent, of +/−1.5% (corresponding to +/−3σ/m), having an average value m compensated up to 90% by a common-mode compensation current itself dispersed at +/−1.5% (corresponding to +/−3σ/m), results in a relative statistic variation on the differential current greater than +/−20% (corresponding to +/−3σ/m). In conditions of setting of the bias currents, of gain of an integrator 28, defined by capacitance $C_{int}$ 32, and of usual integration duration $T_{int}$ for this type of circuit, such an input differential current dispersion may easily amount to from 0.3 V to 0.5 V of spatial dispersion ΔNC of the extension of continuous level NC, to be compared with the total electric dynamic range ($D_{el}$) from 2 to 3 V usually available at the output of integrator 28.

Such a distribution thus already severely limits the useful scene dynamic range, defined as the residual voltage space between the saturation limits of the output ($D_{el}$), decreased by width ΔNC of the previously-estimated NC distribution, divided by the average response (or responsiveness) $\Re$ =dNC/$dT_{sc}$ of the detector, where $T_{sc}$ is the scene temperature:

$$D_{sc}=(D_{el}-\Delta NC)/\Re \quad (1)$$

When the substrate temperature increases, the relative dispersion of the various bolometric resistances is at best essentially unchanged, admitting that the temperature coefficient TCR of each bolometer is identical, which is only true at the first order. However, all resistances very substantially decrease due to the generally negative TCR, in the order of −2%/K, of usual thermometric materials. Thereby, the absolute dispersion of the bias currents, that is, also of output levels NC, progressively increases with the substrate temperature.

Another limitation is due to natural response dispersions, appearing at the denominator in relation (1), usually of technological origin, of active bolometers 16. Such dispersions also very significantly contribute to limiting the scene dynamic range, all the more as the observed scene is at a high temperature.

Various techniques have been described in prior art to compensate for global variations of the average continuous level or/and offset dispersions.

According to a first technique, for example described in document U.S. Pat. No. 6,433,333, the corrections are obtained by means of a series of factory pre-calibrations at various temperatures.

Another technique, taught by document U.S. Pat. No. 6,690,013, implements a modeled estimate of the corrections to be made according to the substrate temperature.

Another technique further comprises performing a time filtering of the fixed signal components, for example according to document WO 2007/106018.

However, such techniques are based on a correction applied after the forming of the signals by the read circuit. As a result, although they are efficient in terms of stability and dispersion of the corrected signal, they do not address the problem of the progressive scene dynamic range loss when the ambient temperature increases.

To attempt pushing back this limitation, another class of techniques has been developed, with the object of correcting disturbances linked to the substrate temperature upstream of the forming of signals by the read circuits.

Thus, documents U.S. Pat. No. 5,756,999 and U.S. Pat. No. 6,028,309 describe the correction of the offset dispersion of detection bolometers by the application of a variable biasing thereof. Indeed, the signal originating from a detection bolometer directly depends on the current flowing therethrough. By modifying this current, the output average continuous level, and thus the value of its offset, is thus modified. However, this type of correction requires a constraining calibration and implementation protocol, which requires a complex circuit with digital-to-analog converters associated with memories external to the read circuit, to manage, for each frame, the individualized biasing of each bolometer. Further, the in-service modification of the biasings offsets in spatially distributed manner, that is non-uniformly, the operation settings of the suspended membranes with respect to factory calibration conditions, and results in a loss of accuracy, which loss is variable according to the ambient conditions, on gain corrections initially calibrated in factory. This results in an alteration of the image quality.

Another technique intended to compensate average continuous level variations is described in document U.S. Pat. No. 7,417,230. In this document, no common-mode compensation structure is associated with the detection bolometers. Such a technique uses an average output signal $S_{out}$ of the detection bolometers to dynamically modify by feedback the biasing applied to the detection bolometers. Specific embodiments use bolometers thermalized to the substrate, operating as temperature probes from which a specific independent output signal injected through a feedback loop on the bias voltage(s) of detection bolometers is established. However, this technique first makes up for the absence of thermalized compensation bolometer directly in the signal forming.

Now, an essential limitation connected to the absence of compensation bolometer in the "offset branch" is the need to decrease the bias voltage of detection bolometers when the substrate temperature increases, substantially by the same proportion as the detection bolometer resistance decrease. This mode actually essentially amounts to operating the retina under constant current. However, the signal-to-noise ratio of a bolometer substantially degrades when the bias voltage decreases. As a result, the performance of the detector according to this technique more rapidly degrades with temperature than if the biasing was maintained in the vicinity of its nominal and optimal in-factory setting point. Further, the dynamic principle of the feedback results in eliminating from the useful signal variations due to the average scene temperature. There is thus no more direct way of knowing this temperature, in other words, such a system is not applicable in thermography.

There thus remains a need to substantially correct this scene dynamic range limitation of bolometric detectors which are not temperature-regulated, to have objects capable of operating satisfactorily very far from the reference temperature used for the detector setting.

SUMMARY OF THE INVENTION

The invention aims at providing a bolometric detector based on bolometric membranes suspended above a substrate, comprising a common-mode bolometric compensation structure, having a scene dynamic range that can be used over a wide range of substrate temperatures, and usable both in infrared imaging and pyrometry.

For this purpose, a object of the invention is a bolometric detector for detecting an infrared radiation, comprising an array of detection bolometers each comprising a bolometric membrane suspended above a substrate, comprising:
  associated with each of the detection bolometers;
  a detection branch comprising the detection bolometer and a bias circuit to set the voltage across said detection bolometer according to a voltage set point;
  a compensation branch comprising a compensation bolometer substantially having the substrate temperature, and a bias circuit for setting the voltage across the compensation bolometer according to a voltage set point; and
  an integrator for generating a voltage by integrating a difference between the current flowing through the detection bolometer and the compensation bolometer, said integrator having a predetermined output electric dynamic range;
  a circuit for controlling the voltage set points of the bias circuits of the detection and compensation branches.

According to the invention, the circuit for controlling the voltage set points comprises:
  a circuit for generating a quantity depending on a substrate temperature, comprising:
    at least one bolometer substantially having the substrate temperature; and
    a circuit for biasing said at least one bolometer, the biasing of said at least one bolometer generating said quantity;
  a circuit for generating the voltage set points of the detection and compensation branches according to said quantity, so that, when the bolometer array is exposed to a uniform reference scene, the average of the differences between the currents flowing through the detection bolometers and the compensation bolometers is within the integrator dynamic range for a substrate temperature range from −30° C. to +90° C.

"Associated" means the forming of a circuit comprising a detection branch, a compensation branch, and an integrator on reading of the detection bolometer, with the possibility of providing a compensation branch for a plurality of detection branches, for example, for each column in the array, or for each detection branch.

In other words, the bias voltages are modified to obtain a difference between the common-mode detection and compensation currents resulting in output voltages in the electric dynamic range of the integrators. The value of these common-mode currents indeed depends on the voltages applied across the detection and compensation bolometers. Thereby, the average continuous level of the detector varies less rapidly with the temperature detector than the average continuous level of detectors of the state of the art, such as for example those illustrated in relation with FIGS. 1 and 2, the detector being thus capable of operating in a wide temperature range, particularly between −30° C. and +90° C.

Further, only the substrate temperature is taken into account for the setting of the bias voltages of the detection bolometers. Particularly, continuous level NC is never measured or estimated and taken into account in the setting of the bolometer bias voltages. Essentially, the bias voltages follow rules which are only variable according to the substrate temperature. The detector output signals thus remain free to vary according to the average scene temperature, thus allowing an application both in infrared imaging and in infrared pyrometry.

It should further be noted that the bolometer biasing is always performed with a spatially uniform and constant voltage, the useful information being thus contained in the current flowing through the bolometers. Indeed, the "reading" of a bolometer also comprises, according to the invention, imposing thereto a bias voltage implying the flowing of a current for a predetermined integration time period $T_{int}$. Since integration time period $T_{int}$ is very short, in the order of a few microseconds for a detector of standard format and frequency (65 μs maximum @ 60 Hz in ¼VGA format), the substrate temperature variation observed for such a time period is thus zero in practice. The temperature being substantially constant during the integration, the bias voltages, which only substantially vary according to this temperature, are thus also constant for said time period. A significant variation of these voltages can only appear in practice on a time scale of a great number of frames, amounting to at least a few seconds, or even minutes, given the thermal inertia of the substrate and of the masses of the package to which it is usually attached, precisely to limits fast variations thereof.

According to an embodiment, the circuit for generating the voltage set points generates voltage set points so that:
  currents $I_{ac}^{mc}$ flowing through the detection bolometers follow in real time a law according to relation:

$$I_{ac}^{mc} = A \cdot (1 + f1(FPT))$$

currents $I_{cm}^{mc}$ flowing through the compensation bolometers follow in real time a law according to relation:

$$I_{cm}^{mc} = B \cdot (1 + f1(FPT))(1 + f2(FPT))$$

in which expressions A and B are constant predetermined parameters $f1(FPT)$ and $f2(FPT)$ are predetermined positive or zero functions of temperature FPT of the substrate, function $f2(FPT)$ being limited so that the continuous level is in the dynamic range of the integrators.

"Real time" here means that the temperature-dependent quantity of the substrate and the voltage set points are regularly updated, for example, once per frame, or continuously when the generation of such quantities is performed analogically. Further, as previously described, laws $f1(FPT)$ and $f2(FPT)$ are variable substantially only according to temperature FPT.

According to an embodiment, the circuit for generating the voltage set points generates voltage set points so that ratio $$\frac{I_{ac}^{mc}}{I_{cm}^{mc}}$$

between current $I_{ac}^{mc}$ flowing through the detection bolometers and current $I_{cm}^{mc}$ flowing through the compensation bolometers is equal to:

$$\frac{I_{ac}^{mc}}{I_{cm}^{mc}} = D \times (1 + f2(FPT))$$

Where D is a constant predetermined parameter, and $f2(FPT)$ is a predetermined positive or zero function of temperature FPT of the substrate.

More specifically, function $f2(FPT)$ is of the second order, particularly smaller than 0.1.

More particularly, function $f2(FPT)$ increases along with temperature FPT of the substrate.

According to an embodiment, the circuit for generating the quantity depending on the substrate temperature comprises:
  a current mirror comprising a first and a second branches, each branch comprising an input and an output;
  a constant current source connected to the input of the first branch of the current mirror;
  a first resistor connected between the output of the first branch of the current mirror and a first constant potential, the first resistor comprising a first bolometer substantially having the substrate temperature, and having a resistance substantially identical to that of the detection bolometers, and a non-bolometric resistor series-connected with the first bolometer;
  a second resistor connected between the output of the second branch of the current mirror and the first constant potential, the second resistor comprising a second bolometer, substantially identical to the first bolometer, the current flowing through the second branch of the current mirror forming said quantity; and
  a third resistor connected between the input of the second branch of the current mirror and a second constant potential.

Another objet of the invention is a bolometric detector for detecting an infrared radiation, comprising an array of detection bolometers each comprising a bolometric membrane suspended above a substrate, comprising:
  associated with each of the detection bolometers:
  a detection branch, comprising the detection bolometer and a bias circuit to set the voltage across said detection bolometer according to a voltage set point;
  a compensation branch, comprising a compensation bolometer substantially having the substrate temperature, and a bias circuit for setting the voltage across the compensation bolometer according to a voltage set point; and
  an integrator for generating a voltage by integrating a difference between the current flowing in the detection bolometer and the compensation bolometer, said integrator having a predetermined output electric dynamic range;
  a circuit for controlling the voltage set points of the bias circuits of the detection and compensation branches.

The circuit for controlling the voltage set points comprises:
  a circuit for generating a quantity depending on a substrate temperature, comprising:
    at least one bolometer substantially having the substrate temperature; and
    a circuit for biasing said at least one bolometer, the biasing of said at least one bolometer generating said quantity;
  a circuit for generating the voltage set points of the detection and compensation branches according to said quantity, said circuit comprising:
    a current mirror comprising a first and a second branches, each branch comprising an input and an output;
    a constant current source connected to the input of the first branch of the current mirror;
    a first resistor connected between the output of the first branch of the current mirror and a first constant potential, the first resistor comprising a first bolometer substantially having the substrate temperature, and having a resistance substantially identical to that of the detection bolometers, and a non-bolometric resistor series-connected with the first bolometer;
    a second resistor connected between the output of the second branch of the current mirror and the first constant potential, the second resistor comprising a second bolometer, substantially identical to the first bolometer, the current flowing through the second branch of the current mirror forming said quantity; and
    a third resistor connected between the input of the second branch of the current mirror and a second constant potential.

More specifically, the non-bolometric resistor of the first resistor is programmable over a range of values between 0 and 30% of the resistance value of the bolometer of the first resistor at a predetermined reference temperature. Advantageously, the non-bolometric resistor of the first resistor is set to a specific value such that the responsivity of the detection bolometers is essentially constant over a predetermined temperature range of temperature FPT of the substrate. Further, the energy of activation of the bolometer material used is close to 0.18 eV, and the value of the non-bolometric resistor of the first resistor is close or equal to 25% of the value of the bolometric resistor of the first resistor.

According to a variation of the invention, the potential of the terminal of the third resistor which is not taken to the second potential defines a voltage set point for the compensation branch biasing circuits, and the potential of the terminal of the second resistor which is not taken to the first constant potential defines a voltage set point for the detection branch biasing circuits.

Advantageously, the third resistor comprises a third bolometer substantially having the substrate temperature, and having a resistance substantially identical to that of the compensation bolometers. Especially, the resistance of the third bolometer is programmable to position the continuous level within the electric dynamic range of integrators. In particular, the third resistor comprises, in series with the third bolometer, a non-bolometric resistor programmable in a range from 0 to 10% of the resistance value of the third bolometer at a predetermined reference temperature.

According to a variation of the invention:
  the biasing circuit of each detection branch is formed of a first MOS transistor or "TMOS", series-connected with the detection bolometer of the detection branch, between the first potential and a first current node;
  the biasing circuit of each compensation branch is formed of a second TMOS series-connected with the compensation bolometer of the compensation branch, between the second potential and the first current node of the detection branch associated with the compensation branch, and having a polarity opposite to that of the first TMOSs of the detection branches;

the circuit for controlling the voltage set points further comprises a circuit for applying the voltage set points to the bias circuits, comprising:
   a fourth bolometer, substantially identical to the third bolometer;
   a third TMOS, substantially identical to the second TMOS of the compensation branches and series-connected with the fourth bolometer between the second potential and a second current node;
   a fifth bolometer substantially identical to the first and second bolometers;
   a second TMOS, substantially identical to the first TMOSs of the detection branches, and series-connected with the fifth bolometer between the second current node and the first potential;
   a first operational amplifier having its non-inverting terminal connected to the potential of the terminal of the third resistor which is not taken to the second potential, having its inverting terminal connected to the terminal of the fourth bolometer which is not taken to the second potential, and having it output connected to the gate of the third TMOS;
   a second operational amplifier having its non-inverting terminal connected to the potential of the terminal of the second resistor which is not taken to the first potential, having its inverting terminal connected to the terminal of the fifth bolometer which is not taken to the first potential, and having it output connected to the gate of the fourth TMOS;
   the gate of the second TMOS of each compensation branch is connected to the potential formed between the fourth bolometer and the third MOS transistor;
   and the gate of the first TMOS of each detection branch is connected to the potential between the fifth bolometer and the fourth TMOS.

More specifically, the device further comprises:
   a first circuit for processing the voltage at the output of the integrator associated with the detection bolometer;
   an integrator, associated with the circuit for controlling the voltage set points and identical to the integrator associated with the detection bolometer, to generate a voltage by integrating a difference between the current flowing through the fourth bolometer and the current flowing through the fifth bolometer;
   a second circuit for processing the output voltage of the integrator associated with the circuit for controlling the voltage set points and identical to the first processing circuit; and
   an analog-to-digital converter for converting the difference between the output voltages of the first and second processing circuits.

Particularly:
   the biasing circuit of each detection branch is formed of a first MOS transistor or "TMOS", series-connected with the detection bolometer of the detection branch, between the first potential and a first current node;
   the biasing circuit of each compensation branch is formed of a second TMOS series-connected with the compensation bolometer of the compensation branch, between the second potential and the first current node of the detection branch associated with the compensation branch, and having a polarity opposite to that of the first TMOS of the detection branches;

the control circuit further comprises a circuit for applying the voltage set points to the bias circuits, comprising:
   for each compensation branch, an operational amplifier having its non-inverting terminal taken to the potential of the terminal of the third resistor which is not taken to the second potential, having its inverting terminal connected between the compensation bolometer and the second TMOS of the compensation branch, and having it output connected to the gate of the second transistor of the compensation branch;
   for each detection branch, a second operational amplifier having its non-inverting terminal taken to the potential of the terminal of the third resistor which is not taken to the first potential, having its inverting terminal connected between the detection bolometer and the first TMOS of the detection branch, and having it output connected to the gate of the first TMOS of the detection branch.

According to an embodiment of the invention, the circuit for generating the voltage set points comprises:
   an analog-to-digital converter, connected to the circuit for generating said quantity, generating a digital value of said quantity;
   a digital data processing unit generating digital values of the voltage set points according to the digital value of said quantity;
   a digital-to-analog converter, connected to the processing unit and generating the voltage set points of the bias circuits according to the digital values of the set points.

Another object of the invention is to provide a detector substantially more tolerant than detectors of the reference technique at the level of the D.C. operation power supplies. This results, on the one hand, in a more extended scene dynamic range-operational temperature range couple and, on the other hand, in an improvement of the signal-to-noise ratio performance with an improved manufacturing cost.

BRIEF DESCRIPTION OF THE DRAWINGS

The present invention will be better understood on reading of the following description provided as an example only in relation with the accompanying drawings, where the same reference numerals designate the same or similar elements, among which.

DETAILED DESCRIPTION OF THE INVENTION

Figure 1:
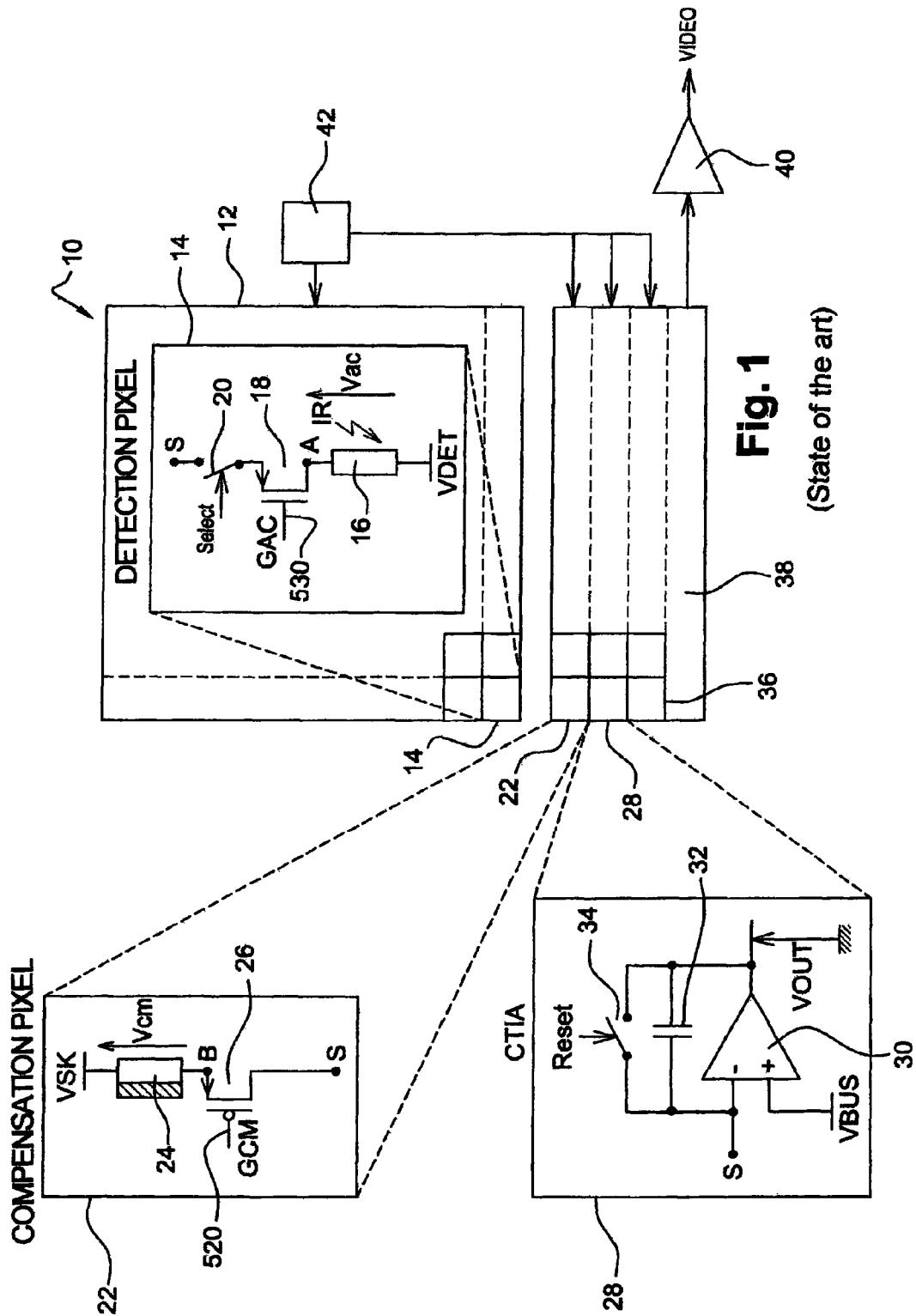
FIG. 1 is an electric diagram of an infrared bolometric detector of the state of the art, already described hereabove.
Figure 2:
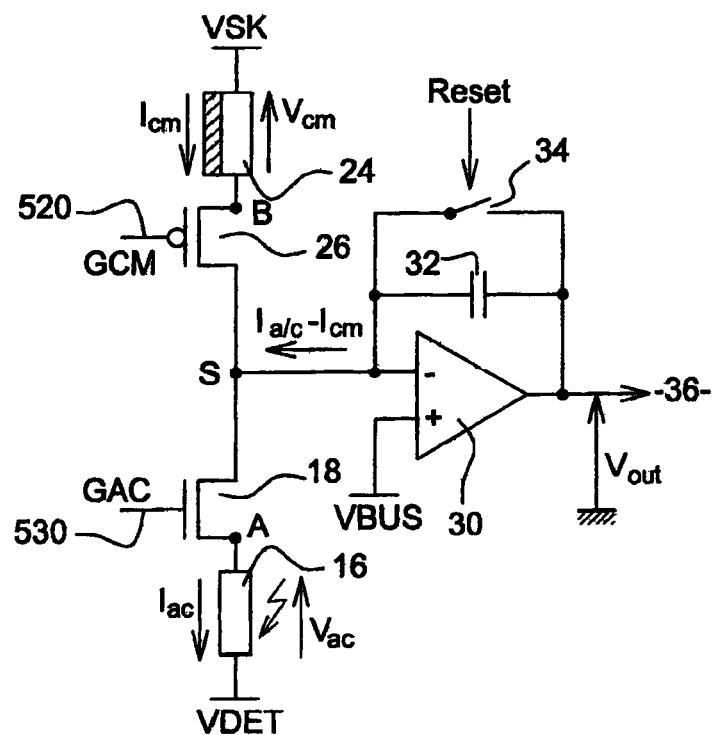
FIG. 2 is an electric diagram illustrating the reading of a sensitive bolometer of the detector of FIG. 1 by means of a compensation structure.
Figure 3:
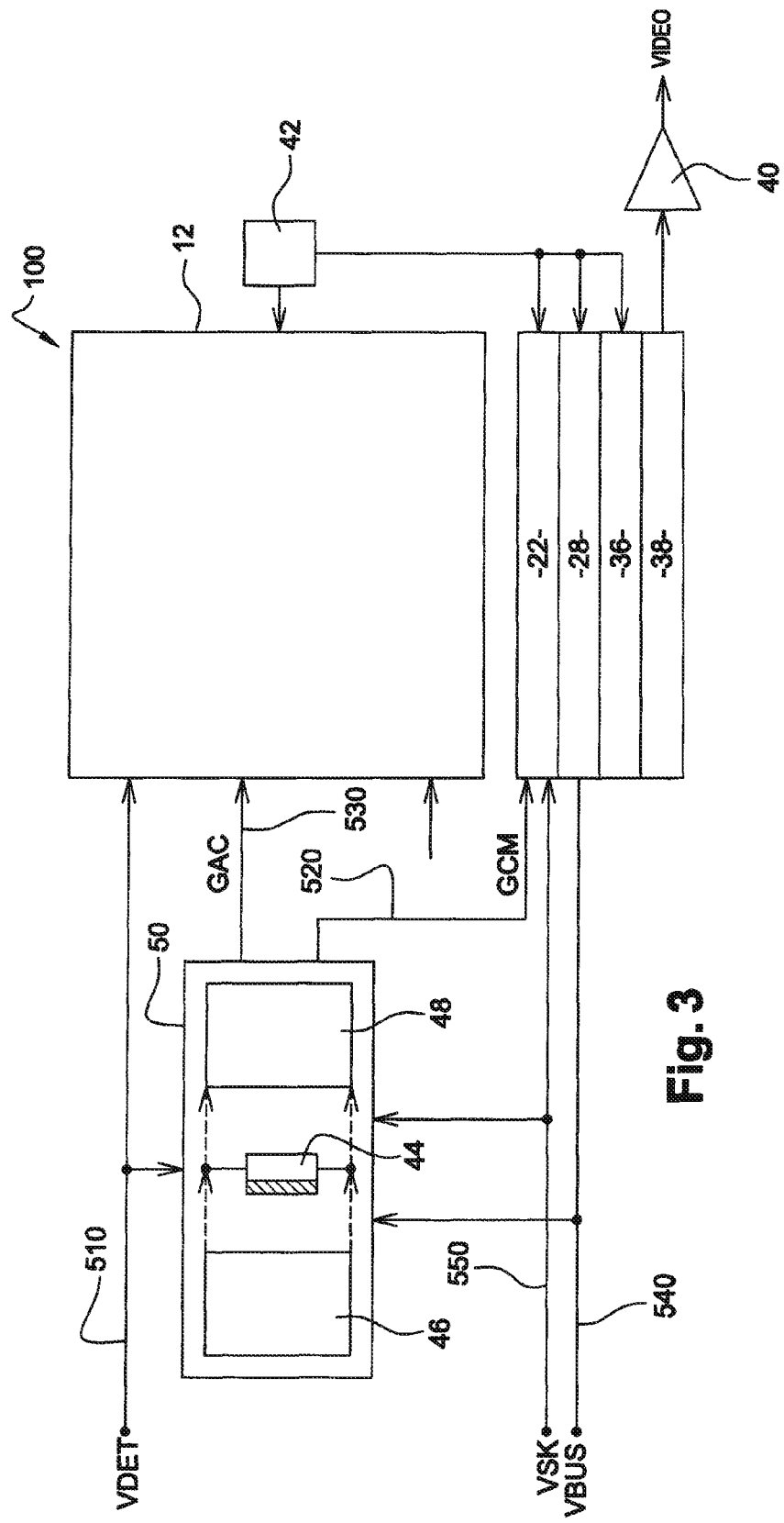
FIG. 3 is an electric diagram of an infrared bolometric detector according to the invention.
Figure 4:
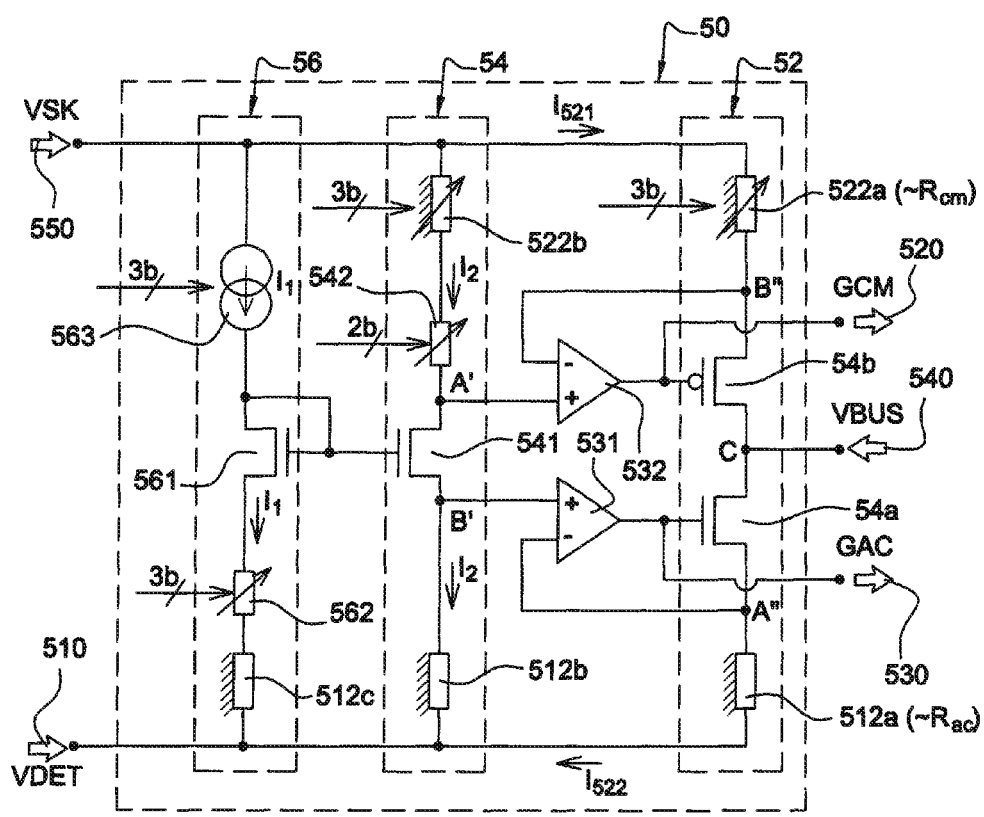
FIG. 4 is an electric diagram of a first embodiment of the circuit for controlling the gate voltages of the bias transistors of the detector of FIG. 3.

The following will describe, in relation with FIGS. 3 and 4, a detector 100 according to the invention in the context of an application to the detector described in relation with FIGS. 1 and 2. Detector 100 thus comprises an array 12 of unit bolometric detection elements 14, or "pixels", a compensation structure 22, an integrator 28, and a sample-and-hold device 36 at the foot of each column of array 12, a multiplexer 38, an amplifier 40, and a sequencing unit 42.

According to the invention, detector 100 further comprises a circuit 50 controlling gate voltage GAC of MOS biasing transistors 18 of detection bolometers 16, gate voltage GAC being delivered to transistors 18 via a first control bus 530, and gate voltage GCM of MOS biasing transistors 26 of compensation bolometers 24, gate voltage GCM being delivered to transistors 26 via a second control bus 520.

Control circuit 50 comprises:
a bolometric circuit 44 comprising at least one bolometer essentially thermalized to the substrate;
a circuit 46 for biasing the at least one bolometer of bolometric circuit 44 to generate a quantity MFPT, for example, a current and/or a voltage, depending on the substrate temperature, and accordingly reflecting the variations thereof;
a circuit 48 for generating gate voltages GAC and GCM of MOS biasing transistors 18, 26 according to quantity MFPT depending on the substrate temperature generated by the biasing of the at least one bolometer of circuit 44.

Particularly, generation circuit 48 determines gate voltage set points GAC and GCM according to quantity MFPT, and thus voltages VA at the sources of MOS transistor 18 and voltages VB at the drains of MOS transistors 26, so that the application of voltages GAC and GCM to biasing transistors 18, 26 generates differences in the common-mode currents flowing through the detection and compensation bolometers such that the average of the voltages resulting from the integration of these differences by integrator 28 is within electric dynamic range $D_{el}$ of integrators 28 for an extended temperature range, especially a substrate temperature range from −30° C. to +90° C. In other words, circuit 48 generates, according to the substrate temperature, bias voltages of detection bolometers 16 and of compensation bolometers 24 which are dependent on each other. More specifically, the bias voltages controlled by circuit 48, and thus, as a consequence, the common-mode currents flowing through the bolometers, have relative variations minimized with respect to the state of the art for the previously-mentioned temperature interval.

For this purpose, circuit 48 may for example contain gate references tabulated according to quantity MFPT and determined in a factory calibration by varying the substrate temperature and by submitting bolometer array 12 to a temperature-uniform scene.

FIG. 4 illustrates a first embodiment of analog circuit 50 for controlling the gate voltages of biasing transistors 18 and 26. Circuit 50 is powered at its input between potentials VSK, carried by a power supply line 550, and VDET, carried by a power supply line 510, and outputs voltages GCM and GAC respectively conveyed by control buses 520 and 530.

Circuit 50 comprises three parallel current branches 52, 54, and 56 connected between voltage VSK and voltage VDET. Circuit 50 is driven from branch 56, formed of a programmable constant current generator 563 for example, over 3 bits, which injects a constant current $I_1$ into branch 56 through a first MOS transistor 561 and series-connected resistors 512c and 562.

"Constant current", means that nominally, there is no need to modify current $I_1$ for the detector to operate according to the invention over the entire envisaged temperature range. It should however be clear that for reasons unconnected to the context of the invention, it may be useful or advantageous to modify this drive current, for example, on each starting, or even, during a same use sequence, for example to adjust operating parameters such as the frame frequency or the integration capacity. Similarly, it by no means excluded to modify this setting in operation, for example, to incrementally or continuously control it, via analog or/and algorithmic arrangements of circuits internal or external to the detector, for the optimization of specific characteristics of the system.

Branch 54, which conveys a current $I_2$, is formed of a first resistor 522b, optionally of an additional resistor 542, of a second MOS transistor 541 identical to MOS transistor 561, and of resistor 512b in series. Further, the gates of MOS transistors 561 and 541 are connected together and to the drain of MOS transistor 561, thus forming a current mirror. Said current mirror is here conventionally formed by a pair of MOS transistors. Generally, it can be described as a first branch (upstream, here formed of MOS transistor 561) having an input (here connected to current generator 653) and an output (here connected to resistors 512c and 562) and a second branch (downstream, here formed of MOS transistor 541) having an input (here connected to resistors 522b and 542) and an output (here connected to resistor 512b). The upstream branch drives the current of the downstream branch according to the configuration of the elements arranged in the downstream branch by means of a connection with a zero static current (here between the gates of MOS transistors 562 and 542).

Voltages VA' and VB' obtained at source A' and at drain B' of MOS transistor 541 are transferred, to within a negligible offset, via non-inverting inputs of operational amplifiers 531 and 532 respectively to points A" and B" of branch 52, where a resistor 522a, a MOS transistor 54b identical to MOS transistors 26 arranged in compensation branches 22, a MOS transistor 54a identical to MOS transistors 18 arranged in detection branches 14, and a resistor 512a, are series-connected. MOS transistor 54a has its gate driven by the output of amplifier 531, and MOS transistor 54b has its gate driven by the output of amplifier 532.

Finally, the low-impedance voltages formed at the output of amplifiers 531 and 532 on the gates of MOS transistors 54a and 54b are respectively conveyed by control buses 530 and 520 respectively to the gates of transistors 18 and 26. The bias voltages (VA−VDET) of detection bolometers 16 and the bias voltages (VSK−VB) of compensation bolometers 24 are thus substantially identical at any temperature respectively to voltages (VA'−VDET) and (VSK−VB').

Resistors 512a, 512b, 512c, 522a, and 522b are formed of bolometers thermalized to the substrate, to follow the temperature variations of said substrate. Further, the resistances of bolometers 512a, 512b, and 512c are defined by construction at values substantially identical or close to resistor $R_{ac}$ of detection bolometers 16. Resistors 522a and 522b have close values, and in a specific variation of the invention, values close to resistance $R_{cm}$ of compensation bolometers 24. "Close" means that these resistances can be modified independently from each other within a range of values $[(1-a) \cdot R_{cm}, (1+a) \cdot R_{cm}]$, where a is a positive number smaller than 0.1, and preferably in the order of 0.05, by means of typically three setting bits, with an aim which will be specific hereafter. The set of elementary resistors forming final resistors 522a and 522b is of bolometric type.

Resistor 562 is adjustable, but not bolometric, that is, formed by standard microelectronic resistive elements varying very little according to the FPT as compared with bolometric structures. Resistor 562 is for example adjusted by means of 3 programmable bits, in a limited indicative range from 0 to 30% of resistance 512c at a reference temperature of for example 30° C. Additional resistor 542 is also non bolometric and settable over, for example, 3 bits, enabling to adjust its value between 0% and typically a few %, for example 5%, of resistance 522b.

Reference voltage VBUS of integrators 28 is applied to point C of branch 52 between MOS transistors 54a and 54b, to discharge or inject current difference $I_{522} - I_{521}$ which appears in the general case between the upper and lower half-branches of branch 52, so that the potentials of nodes A" and B" establish at the desired rest points of nodes A and B of detection and compensation branches 14 and 22.

The gate potential of MOS transistors 541 and 561, expressed in the two lower half-branches of branches 54 and 56 seen on the source side of MOS transistors 541 and 561, that is, on the output side of the upstream and downstream branches of the current mirror, enables to deduce the following relation:

$$(R(512c)+R(562)) \cdot I1 + VGS(561) = R(512b) \cdot I2 + VGS(541) \quad (1)$$

where R is the resistance, VGS(561) and VGS(541) are the gate-source voltages of MOS transistor 561 and 541, substantially identical since MOS transistors 561 and 541 are identical. The resistances of bolometers 512c and 512b being substantially identical or close to each other, it can be deduced that current $I_2$ flowing through branch 54 can be expressed according to relation:

$$I_2 = (1 + R(562)/R(512b)) \cdot I_1 \quad (2)$$

When non-bolometric resistance 562 is set to zero and thus forms a short-circuit, current $I_2$ remains equal to current $I_1$ whatever the substrate. However, when resistance 562 is set to a non-zero value, current $I_2$ varies differently from current $I_1$ when the substrate temperature varies. Current $I_2$ is thus a quantity depending on the substrate temperature, and which reflects the variations thereof.

More specifically, according to the Arrhenius relation, resistance R(512b) of bolometer 512b can be expressed according to relation:

$$R(512b) = R_0(512b) \cdot \exp(Ea/kT) \quad (3)$$

where $R_0(512b)$ is the asymptotic value of resistance R(512b) at an infinite temperature, Ea is the activation energy of the bolometric material of the bolometer, and k is Boltzmann's constant.

Temperature T of bolometer 512b being equal to temperature FPT of the substrate, relations (2) and (3) enable to deduce the variation of current $I_2$ as a function of the substrate temperature, according to relation:

$$I_2 = I_1 \cdot \left(1 + \frac{R(562)}{R(512b)@T_{ref}} \cdot \exp\frac{Ea}{k}\left(\frac{1}{T_{ref}} - \frac{1}{FPT}\right)\right) \quad (4)$$

$$= I_1 \cdot (1 + f1(FPT))$$

where FPT is the substrate temperature and $R(512b)@T_{ref}$ is the resistance of bolometer 512b at reference temperature $T_{ref}$. Particularly, law $f1(FPT)$ is positive and increasing and is substantially variable only as a function of temperature FPT of the substrate. In the following, notation R@T means the value of resistance "R" at temperature "T".

Due to the particular design of circuit 50, it should be noted that current $I_2$, and thus currents $I_{521}$ and $I_{522}$ flowing in current branch 52, substantially represent the common-mode current independent from the illumination of array 12 of detection bolometers 16 formed in the detection and compensation branches illustrated in FIG. 2, respectively conducting the common-mode currents.

More specifically, it can easily be shown, for the time being, discarding or neglecting the self-heating phenomenon appearing on detection bolometers 16, that for a zero resistance 542, common-mode detection current $I_{ac}^{mc}$ flowing through detection bolometers 16 and common-mode compensation current $I_{cm}^{mc}$ flowing through compensation bolometers 24 are proportional to current $I_2$ according to relations:

$$I_{ac}^{mc} = A \cdot I_2 = A \cdot I_1 \cdot (1 + f1(FPT)) = A_{ac} \cdot (1 + f1(FPT)) \quad (5)$$

$$I_{cm}^{mc} = B \cdot I_2 = B \cdot I_1 \cdot (1 + f1(FPT)) = B_{cm} \cdot (1 + f1(FPT)) \quad (6)$$

where A and B are constants.

Current $I_1$ being further selected to be constant, ratio $$\frac{I_{ac}^{mc}}{I_{cm}^{mc}}$$

is thus constant whatever temperature FPT of substrate. Advantageously, circuit 50 is designed so that ratio $$\frac{I_{ac}^{mc}}{I_{cm}^{mc}}$$

is equal to 1. Since the bias voltages of detection and compensation bolometers 16 and 24 decrease when the substrate temperature increases, the difference in absolute value of common-mode detection and compensation currents, and thus also the average continuous level, varies less than in the configuration of the state of the art with constant bias voltages. In other words, voltages VA and VB respectively setting the biasing of sensitive and compensation bolometers 16 and 24, and thus currents $I_{ac}^{mc}$ and $I_{cm}^{mc}$, depend on each other. More specifically, voltages VA and VB, or equivalently, currents $I_{ac}^{mc}$ and $I_{cm}^{mc}$, compensate for each other. For example, when current $I_{ac}^{mc}$ decreases, current $I_{cm}^{mc}$ decreases by same proportions due to the constancy of ratio $$\frac{I_{ac}^{mc}}{I_{cm}^{mc}},$$

and conversely.

As can be seen in relations (3), (5), and (6), the slope of currents $I_2$, $I_{ac}^{mc}$, and $I_{cm}^{mc}$ according to temperature FPT of the substrate, that is, the "responsiveness" of these current to the substrate temperature, is particularly defined by the setting of non-bolometric resistance 562 with respect to bolometric resistance 512b. Further knowing that the detection bolometer bias voltage has a direct influence on the detector response, resistor 562 thus for example enables to also set this sensitivity.

The setting of the resistance of bolometer 522b enables to set the average continuous level (NC) to an adapted value in the dynamic range of integrators 28. Indeed, the average resistances of detection and compensation bolometers 16 and 24 at the end of their detector manufacturing process, are usually only known at the first order. The setting of the resistance of bolometer 522b enables to adjust the bias voltage in the compensation branch to adequately position the average continuous level in the dynamic range of integrators 28, at least at reference temperature $T_{ref}$. Indeed, the modification of the resistance of bolometer 522b directly results in a displacement of voltage GCM at the output of circuit 50, and thus into a displacement of the position of the output average continuous level in the dynamic range of integrators 28.

Activation energy Ea of the sensitive bolometer material ordinarily is in the order of 0.18 eV. Relation (4) shows that by setting resistance R(562) to 30% of resistance R(512b)@$T_{ref}$, current $I_2$ is thus substantially equal to 1.3*$I_1$ at reference temperature $T_{ref}$, and asymptotically decreases towards $I_1$ as the substrate temperature decreases below the reference temperature. Conversely, when the substrate temperature increases beyond temperature $T_{ref}$, current $I_2$ regularly increases to reach approximately 2*$I_1$ at 90° C. for a reference temperature $T_{ref}$ of 30° C.

Figure 5:
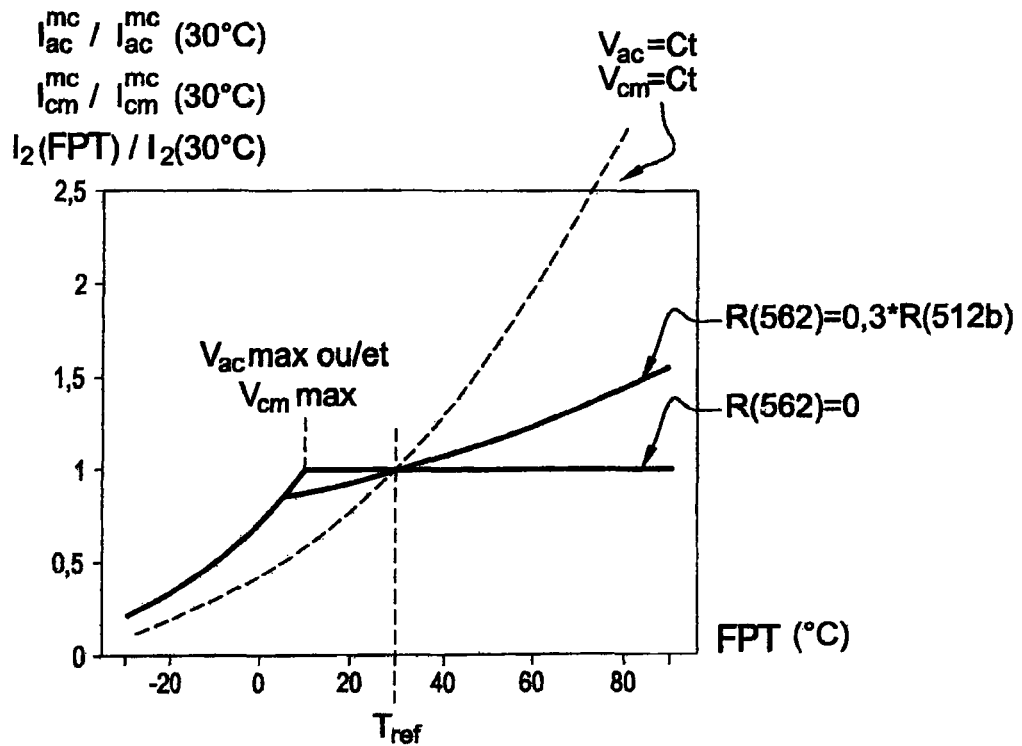
FIG. 5 illustrates curves of the relative variation of the currents formed in the various branches of the detector of the invention and of the detector of the state of the art according to the substrate temperature.

The behavior of current $I_2$ is graphically illustrated in further detail in FIG. 5, in normalized form at the value that it has at reference temperature $T_{ref}$=30° C., according to temperature FPT of the substrate, in various cases of setting of the adjustment resistance. As previously described, the common-mode detection currents and the common-mode compensation currents are proportional to current $I_2$ for a zero resistance 542, so that the shown curves also correspond to these common-mode currents respectively normalized to their value at reference temperature $T_{ref}$.

Further, FIG. 5 also illustrates in dotted lines the variation of common-mode current $I_{ac}^{mc}$ flowing through a detection bolometer 16 normalized at its value at reference temperature $T_{ref}$ for a constant voltage biasing ($V_{ac}$=Ct and $V_{cm}$=Ct), such as usually performed according to the state of the art illustrated in FIGS. 1 and 2.

For low substrate temperatures, typically below −10° C., the detection and compensation common-mode currents become very low, given the increase of the bolometric resistances, which adversely affects the detector sensitivity since the capacity of integrators 28 becomes inappropriate. For high temperatures of the substrate, however, the common-mode currents become very high, and a "premature" saturation of integrators 28 as well as linearity issues due to the self-heating of the detection bolometers under the effect of their biasing can be observed in the state of the art, as explained previously. Further, as previously detailed, the scene dynamic range of the detector becomes rapidly very low well before the saturation, and this all the sooner in terms of temperature as the resistances of the detection and/or compensation bolometers are initially dispersed.

As already previously indicated, if resistor 562 of drive branch 56 is programmed to a zero or very low value, the current flowing in branches 52 and 54 is not temperature-dependent and the biasing of detection and compensation bolometers 16 and 24 is thus also constant according to the substrate temperature. This embodiment however has the advantage, on the high temperature side, of maintaining substantially constant the current levels to be integrated, which completely eliminates problems of integration linearity, or even of momentary saturation during the integration, due to the self-heating of the detection bolometers. However, the major disadvantage is a decrease of the detector sensitivity due to the lowering of temperature coefficient TCR of the detection and compensation bolometers as their temperature increases.

Conversely, the various bolometric resistance increase as the temperature decreases, up to the point where the amplitude of the power supply (VSK−VDET) becomes insufficient to maintain the common-mode detection and compensation currents at their values set at 30° C. This saturation point is indicated in FIG. 5 by a limit in dotted lines towards FPT=10° C. Below this point, the behavior of the various currents joins the reference state of the art, for constant maximum power supply voltages.

It should be noted that the heat dissipation inside of the package integrating the detector, linked to the circuit operation, usually takes temperature FPT of the substrate to some 10 to 15° C. above the ambient temperature to which the package is submitted, so that this power supply saturation point actually is not a significant limitation of the effective field of application of the invention. Further, as already mentioned, the detector keeps on operating at very low temperatures, according to a different rate, which is however not degraded with respect to the state of the art.

When resistance 562 is programmed to be non-zero, for example, at a value on the order of 30% of resistance $R_{ac}$ (@ 30° C.), and when temperature FPT of the substrate falls below the reference setting point at 30° C., the bias voltages of the detection and compensation bolometers increase and the common-mode detection and compensation currents decrease. Conversely, when temperature FPT of the substrate increases beyond FPT=30° C., the bias voltages of the detection and compensation bolometers decrease and the common-mode detection and compensation currents increase. The satisfactory operating range of the detector, without it being necessary to modify the initial settings at the reference temperature to face the excessive lowering or, on the contrary, the saturation of the various functional currents, is thus substantially extended with respect to the state of the art. The exacerbation of the dispersion of average continuous level NC at high temperature, typical of the voltage biasing, remains moderate, and the optimal sensitivity level obtained at the initial reference point is stabilized over a wide range of detector operating temperatures.

Further, as will be completed hereafter, the moderation of the increase of the common-mode detection and compensation currents with temperature FPT of the substrate tends to stabilize the detector responsiveness, and thus at least to moderate the additional scene dynamic range loss resulting therefrom in the state of the art.

The saturation of the power supply (VSK−VDET) also appears at low temperature, but at a colder point, typically of 5° C., than for the embodiment with a zero or very low resistance R(562).

There advantageously results from this assembly that voltages GAC and GCM generated under low impedance, respectively at the output of operational amplifiers 531 and 532, are such that they provide bias voltages across detection and compensation bolometers 16 and 24 proportional to each other when temperature FPT of the substrate exactly varies according to the potentials of points A" and B" of branch 52 of block 50.

According to a specific variation of the invention, non-bolometric resistor 542 is defined by programming on a series link at a non-zero but limited value, at most in the order of a few % of the resistance value of bolometer 522b at the reference temperature. This setting enables to imbalance currents $I_{522}$ and $I_{521}$, especially by tempering the variation according to the substrate temperature of current $I_{522}$ with respect to the variation of current $I_{521}$, which enables to compensate for the consequences of self-heating, variable according to the substrate temperature in the detection branch, on the stability of average continuous level NC, as discussed in the section relative to the state of the art.

Indeed, with a non-zero resistance 542, one has $I_2 \cdot (R(522b)+R(542))=I_{521} \cdot R(522a)$ on the one hand, and $I_2 \cdot R(512b)=I_{522} \cdot R(512a)$ on the other hand. The resistances of bolometers 512a and 512b being selected to be substantially equal, $I_2=I_{522}$ and:

$$\frac{I_{521}}{I_{522}} = \frac{R(522b) + R(542)}{R(522a)} \quad (7)$$

$$= \frac{R(522b)}{R(522a)} \times \left(1 + \frac{R(542)}{R(522b)}\right)$$

$$= \frac{R(522b)}{R(522a)} \times \left(1 + \frac{R(542)}{R(522b)@T_{ref}} \cdot \exp\frac{Ea}{k}\left(\frac{1}{T_{ref}} - \frac{1}{FPT}\right)\right)$$

which can be reformulated according to relation:

$$\frac{I_{521}}{I_{522}} = C(1 + f2(FPT)) \quad (8)$$

where C is temperature-stable constant close to 1 in the general case and equal to 1 in the specific case where the setting of average continuous level NC at the reference temperature results in identical values for resistances R(522b) and R(522a). Factor $f2$, which is positive, is further of the second order, that is, small with respect to 1 at the reference temperature, but increasing when the FPT increases beyond this temperature. In particular, factor $f2$ is typically smaller than 0.1.

In the general case, common-mode detection and compensation currents $I_{ac}^{mc}$ and $I_{cm}^{mc}$ are thus obtained according to relations:

$$I_{cm}^{mc}=C \cdot B_{cm} \cdot (1+f1(FPT))(1+f2(FPT))$$

$$I_{ac}^{mc}=A_{ac} \cdot (1+f1(FPT)) \quad (9)$$

In the variation comprising a non-zero resistance 542, ratio $$\frac{I_{ac}^{mc}}{I_{cm}^{mc}}$$

is thus no longer constant with temperature FPT of the substrate, conversely to the variation where resistance 542 is zero, since this ratio is expressed according to relation $$\frac{I_{cm}^{mc}}{I_{ac}^{mc}} = D \cdot (1 + f2(FPT)),$$

where D is a constant equal to ratio $$\frac{C \cdot B_{cm}}{A_{ac}}.$$

However, due to the low relative value of resistance 542, in the order of a few percents of the resistance of bolometer 522b, ratio $$\frac{I_{cm}^{mc}}{I_{ac}^{mc}}$$

varies little with temperature FPT of the substrate, thus enabling to substantially stabilize average continuous level NC in the dynamic range of integrators 28, as will be described in further detail hereafter. However, function $(1+f2(FPT))$, although having values little greater than 1, enables to efficiently correct the relative differences of the respective paths of resistances R(T) of detection and compensation bolometers 16 and 24 when temperature FPT of the substrate varies, as previously discussed in relation with the self-heating of the detection bolometers 16 only.

As a variation, and in the general case, it is also possible to provide a setting for compensating activation energy differences, or any other phenomenon resulting in temperature offsets of the average continuous level, on each upper and lower half-branch of branch 54 by means of the insertion of a non-bolometric resistor in series, if need be advantageously adjustable by programming. Means for correcting the temperature-stability of the average continuous level in all possible cases are thus available, to the detriment of the circuit complexity, in particular of the number of control bits to be set for its optimized starting.

For that matter, according to the previously detailed embodiment, by assigning a "LSB" resistance value increment from 0.005 to 0.01*R(522b)@30° C. of non-bolometric resistance 542, a 2-bit setting dynamic range is typically sufficient to correct most of the current differences due to the differential self-heating. Indeed, the stability of the average continuous level, already satisfactory at the first order, is here desired to be perfected at the second order by the control of the average continuous level according to temperature FPT of the substrate, of the bias voltages, in correlated manner on the detection and compensation branches, to obtain a stability of the average continuous level in an extended substrate temperature range.

A circuit programmable at the level of resistance 542, which enables to optimize the temperature stability of the NC in a very wide range of detector use conditions, is here provided as the general case. It should be understood that for determined implementation conditions, called "operating perimeter", especially in terms of bias current $I_1$ at the reference temperature, of frame frequency, etc., a predetermined fixed value of resistance 542, for example empirically defined after studying the stability of the NC within this operating perimeter, by means of a study circuit or of sufficiently elaborate simulations. Then, no additional control bits are needed, the circuit calibrated in this way can be simplified with no efficiency loss.

The value of resistance 562 also enables to compensate for responsiveness variation of the detector according to temperature FPT of the substrate. Indeed, responsivity $\Re$ of a bolometric detector read by current integration can be expressed in the context of the invention according to relation:

$$\Re = K \cdot TCR \cdot I_{ac}$$

where K is a constant parameter. By expressing the average response according to temperature FPT of the substrate, in normalized fashion relatively to its value at reference temperature $T_{ref}$, and further considering in virtue of the Arrhenius relation that $TCR=-Ea/(k\cdot FPT^2)$, the following relation can be deduced from the previous relation:

$$\frac{\Re(FPT)}{\Re(T_{ref})} = \frac{I_{ac}^{mc}(FPT)}{I_{ac}^{mc}(T_{ref})} \cdot \left(\frac{T_{ref}}{FPT}\right)^2 \quad (10)$$

The first term of the right-hand member represents the relative increase of the bias current of detection bolometers 16 between temperatures $T_{ref}$ and FPT, the amplitude of which can be set by means of the setting of resistance 562. The second term represents the lowering of temperature coefficient TCR of detection bolometers 16 between temperatures $T_{ref}$ and FPT, imposed by the thermometric material, assumed to be of semiconductor type, such as amorphous silicon or vanadium oxides, for example. Both terms thus vary in opposite directions when temperature FPT of the substrate varies. There thus is a specific value of non-bolometric resistance 562, on which the first term depends, which cancels the relative and absolute variation of responsivity $\Re$ in the vicinity of reference temperature $T_{ref}$. Over an extended temperature interval (FPT−Tref), particularly an interval of several tens of degrees, there similarly exists a specific value of resistance 562 depending at the second order on the considered substrate temperature interval, since the two relative variation terms vary according to different laws, which minimizes the relative and absolute responsiveness variation over this interval.

In other words, there exists a setting point for circuit 50 which minimizes the excursion of the product expressed in the right-hand member of relation (10), on either side of value 1, that is, which generates a substantial compensation of the variations of temperature coefficient TCR in the temperature range of the substrate of interest, with a variation in the reverse direction of common-mode detection current $I_{ac}^{mc}$.

Such a temperature stabilization point of the detector responsiveness is obtained, for a value of activation energy Ea in the order of 0.18 eV, when resistance 562 is set in the vicinity of 0.25*R(522b)@30° C. A slightly different setting is implemented to optimize the stability of the responsivity for other values of activation energy Ea, or other ranges of interest of temperatures FPT of the substrate.

Thereby, with this specific setting, which is valid in the above-mentioned conditions, a responsiveness stability better than +/−2% is obtained between 15° C. and 90° C. of substrate temperature FPT, or even better than +1-1% between 20° C. and 70° C. of substrate temperature FPT. When resistance 562 is set in the vicinity of 0.25*R(522b)@30° C., there is thus practically no further need for a factory calibration, as usually performed, of the average detector responsivity according to the substrate temperature.

In other words, if it is acceptable to be content with an accuracy in the order of 2% (resp. 1% according to the provided conditions), it is possible to operate the detector set in this manner in thermographic (pyrometric) mode, that is, to generate output data corresponding to an information of absolute temperature known on the scene, while having performed a single calibration at the reference temperature. This results in a substantial initial factory calibration saving, and thus in lowering the cost of the camera integrating the detector according to the invention.

In the embodiments of control circuit 50, a maximum ratio of 30% between additional non-bolometric resistance 562 and the resistance of bolometer 512c at the reference temperature has been described. This ratio of the invention is however an indication only. It will be within the abilities of those skilled in the art to retain according to the set of specific features of the considered detector the ratio which will be best adapted to the desired aim, in terms of dispersion, dynamic range, performance, response stability or any other functionally useful parameter. It is of course also possible to recurrently or dynamically modify this ratio in a same detector, to adapt said detector to various uses or operating conditions, even during a same use sequence, since the elements of circuit 50 are easily programmable. Such an adaptation may be performed through a direct control by the user or any protocol, embarked algorithm, or adequate means provided for this purpose. Conversely, since this setting of resistance 562 can be considered as adequate for all the operating conditions provided for the detector, there is no need to form a programmable structure. An optimized fixed arrangement of circuit 50 is perfectly applicable and advantageous to simplify the system and decrease its cost.

Figure 6:
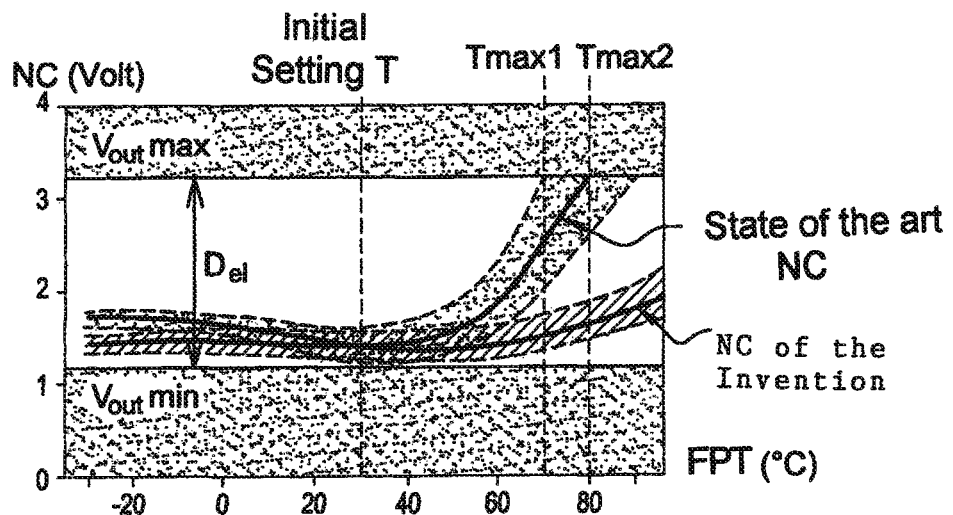
FIG. 6 illustrates curves of the variation of the average continuous level of a bolometer retina of the state of the art and of the invention, according to the substrate temperature.

FIG. 6 illustrates the variation of the average continuous level as a function of temperature FPT of the substrate according to the state of the art illustrated in FIGS. 1 and 2 and according to the detector just described when resistance 542 is zero, that is, with no specific compensation of the differential self-heating effects by means of the setting of resistance 542.

According to the state of the art, the setting of gate voltages GAC and GCM of bias MOS transistors 18 and 24 is performed for the 30° C. temperature so that the average continuous level is positioned in the low portion of the electric dynamic range of integrators 28 to take into account the fact that the detector output signals increase for the biasing type used in the state of the art when the scene is warmer.

At low temperatures, common-mode currents $I_{ac}^{mc}$ and $I_{cm}^{mc}$ substantially decrease due to negative temperature coefficient TCR of detection and compensation bolometers 16 and 24. Accordingly, the integrated differential current also decreases, whereby the average continuous level varies little. Further, the responsivity of detection bolometers decreases in relation with resistance $R_{ac}$ of detection bolometers 16, which causes an inversely proportional increase of scene dynamic range $D_{sc}$. Actually, low temperatures raise no specific issue in the state of the art in terms of stability of the average continuous level and of scene dynamic range.

However, on the high temperature side, the average continuous level drifts, for the circuit biasing case retained as a reference technique, towards the top of the electric dynamic range of integrators 28, as illustrated in curve "NC according to the state of the art". Beyond a substrate temperature noted "Tmax2", the average continuous level is saturated. In a typical configuration of the state of the art, the electric dynamic range of integrators 28 correspond to the range from Vout−min=1.2 V to Vout−max=3.2 V, the saturation of the integrator output thus occurring below 1.2 V and beyond 3.2 V. The detector of the state of the art is thus no longer usable beyond temperature Tmax2. Further, as the average continuous level comes closer to the upper limit of the dynamic range of integrators 28, the scene dynamic range substantially decreases.

Further, as previously, the detection and compensation bolometers exhibit a dispersion of their resistance, causing a dispersion of the output voltages in front of a uniform scene, or "offset" dispersion. The space between the curves in dotted lines show a typical example of the extent of the output voltage offset dispersion in front of the uniform scene of the detector of the state of the art. As previously described, this dispersion extent regularly increases with the substrate temperature and, thereby, beyond a limiting temperature Tmax1 substantially lower than limiting temperature Tmax2, the detector of the state of the art becomes unusable since a portion at least of the retina signals is saturated. Such a loss of operational temperature range is obviously all the greater as the offset dispersion is high.

As mentioned hereabove, when the substrate temperature rises above the reference temperature, resistances $R_{ac}$ and $R_{cm}$ of the detection and compensation bolometers decrease due to their negative temperature coefficient TCR. According to the invention, common-mode currents $I_{ac}^{mc}$ of detection bolometers 16 and common-mode currents $I_{cm}^{mc}$ of compensation bolometers 24 have a variation correlated according to an increasing continuous law, but substantially slower, according to the setting of resistance 562, than what a constant voltage biasing according to the state of the art would provide.

As a result, the respective currents $I_{ac}^{mc}$ in detection branches and $I_{cm}^{mc}$ in the compensation branches differ less, in the case of a zero resistance 542, when temperature FPT of the substrate varies. This generally results in a greater temperature stability of the average continuous level. This stability is illustrated as an example in FIG. 6 by curve "NC according to the invention". When an adapted non-zero resistance 542 is further used, a substantial complementary compensation of the differential effects due to the self-heating of detection bolometers 16, which does not or very little appears with compensation bolometers 24, is obtained. For an optimum setting of resistance 542, for example, empirically accessible, a next-to-perfect stability of average continuous level NC according to temperature FPT of the substrate is obtained.

Further, dispersions ($I_{ac}$max–$I_{ac}$min) and ($I_{cm}$max–$I_{cm}$min), respectively, of the detection and compensation currents due to the dispersion of the intrinsic characteristics of bolometers being proportional to the bias voltages, the dispersion of the continuous levels is also proportional thereto. Thereby, the continuous level dispersion according to the invention is at the first order lower than the continuous level dispersion generated in the state of the art, by a factor (1+ƒ1 (FPT)). Such an advantageous behavior is illustrated by the narrowing of the continuous level distribution envelope illustrated in dotted lines in FIG. 6, particularly towards high temperatures, with respect to the envelope obtained according to the reference technique. Below the reference temperature, when going into details, a slight widening, imperceptible in FIG. 6 given the substantial decrease of the currents, is obtained.

It is preferred, in the framework of the invention, to compensate for the resistance variations of detection bolometers 16 along with temperature FPT of the substrate by controlled variations of the bias voltages, by from 20 to 40% only of the variation of the bolometric resistances by adequately setting resistance 562. In other words, this amounts to retaining a value in the order of 0.3 for the pre-exponential term of relation (4). Such a preference is sufficient to substantially extend, in practice, sufficiently, the operating temperature range of the detector, the upper limit of which is defined by the intersection point of the upper dotted line of curve "state of the art NC" with the high saturation level of the CTIA in FIG. 6.

It can thus be noted that it is possible to have a stable average continuous level for a wide temperature range, particularly a temperature range from at least –30° C. to +90° C.

Figure 7:
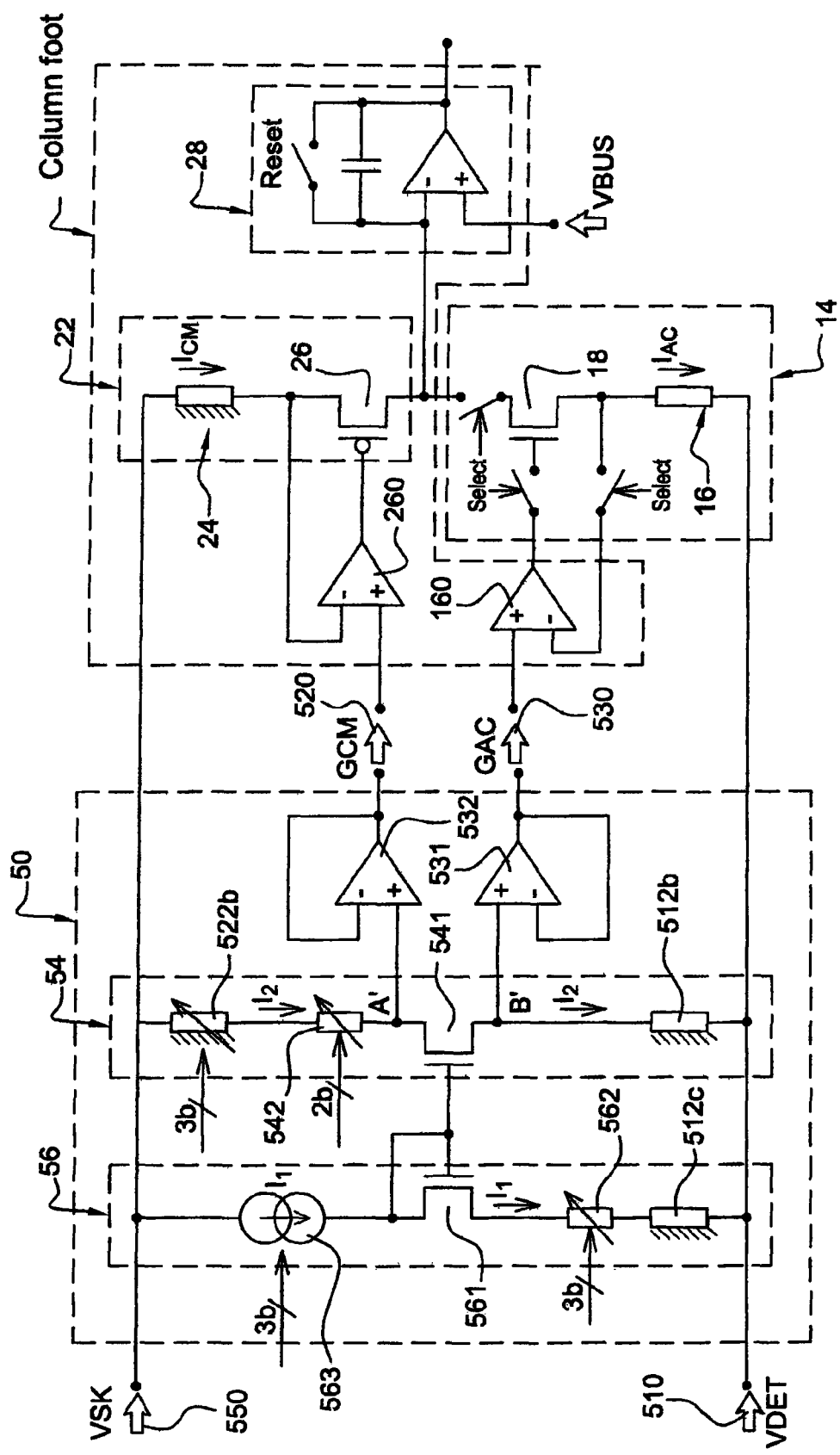
FIG. 7 is an electric diagram of a second embodiment of the circuit for controlling the gate voltages of the bias transistors of the detector of FIG. 3.

FIG. 7 is an electric diagram of a second embodiment of circuit 50 for controlling the gate voltages of bias transistors 18 and 26 of detection and compensation bolometers 16 and 24.

The second embodiment comprises, like the first embodiment, current branches 54, 56 and operational amplifiers 531, 532. Unlike the first embodiment, which comprises third current branch 52, in the second embodiment, the outputs of operational amplifier 531, 532 are looped in follower mode onto their inverting inputs to reproduce potentials VB' and VA' across MOS transistor 541, and respectively connected to control buses 530, 520.

Circuit 100 according to the second embodiment comprises two direct-injection buffers 160, 260 connected to buses 530, 520 and to bias transistors 18, 26 of detection bolometer array 12. More specifically, buffers 160, 260 each comprise an operational amplifier having its non-inverting inputs respectively connected to control buses 530, 520. The inverting input and the output of operational amplifier 260 connected to bus 520 conveying gate voltage GCM are respectively connected between compensation bolometer 24 and bias transistor 26 of each compensation branch 22 arranged at the foot of the column and at the gate of transistor 26 of branch 22. The inverting input and the output of operational amplifier 160 connected to bus 530 conveying gate voltage GAC are respectively connected, via switches controlled by line selection signal Select, between the detection bolometer 16 and the bias transistor 18 of each detection branch 14 of the column having amplifier 160 arranged at its foot and to the gates of bias transistors 18 of detection branches 14. Potentials VA' and VB' are thus substantially reproduced at bias nodes A and B of bolometers 16 and 24 of retina 12.

The second embodiment is of simpler design at the level of block 50, and a little more complex at the foot of the retina. It has the advantage of neutralizing the effect of threshold voltage dispersions of bias MOS transistors 18 and 26, which originally form a non-negligible portion of the continuous level dispersion. As a variation, transistor 18 can be easily displaced to the column foot close to buffer 160 to free circuit space in pixel 14. Such a particular arrangement for example enables to install advantageous electronic functions within the surface reserved for pixel 14, beyond the framework of the invention.

Control voltages GAC and GCM of the embodiments just described may be used to implement other particular functions and/or calculations, as will be illustrated in further detail hereafter. Among such cases, the advantageous implementation of a differential analog-to-digital converter, which requires at one of its inputs the forming of a reference signal time-correlated to the outputs of integrators 28, is provided, as will be described in further detail hereafter. In the first above-described embodiment, this additional reference signal is very advantageously obtained from branch 52 of circuit 50. In the case of the second embodiment described in relation with FIG. 7, such a reference signal may be formed from an additional branch equivalent to branch 52 of the first embodiment, that is, comprising bolometers equivalent to elements 522a and 512a, biased by MOS transistors equivalent to MOS transistors 54b and 54a, respectively driven by buffers 260 and 160.

Figure 8:
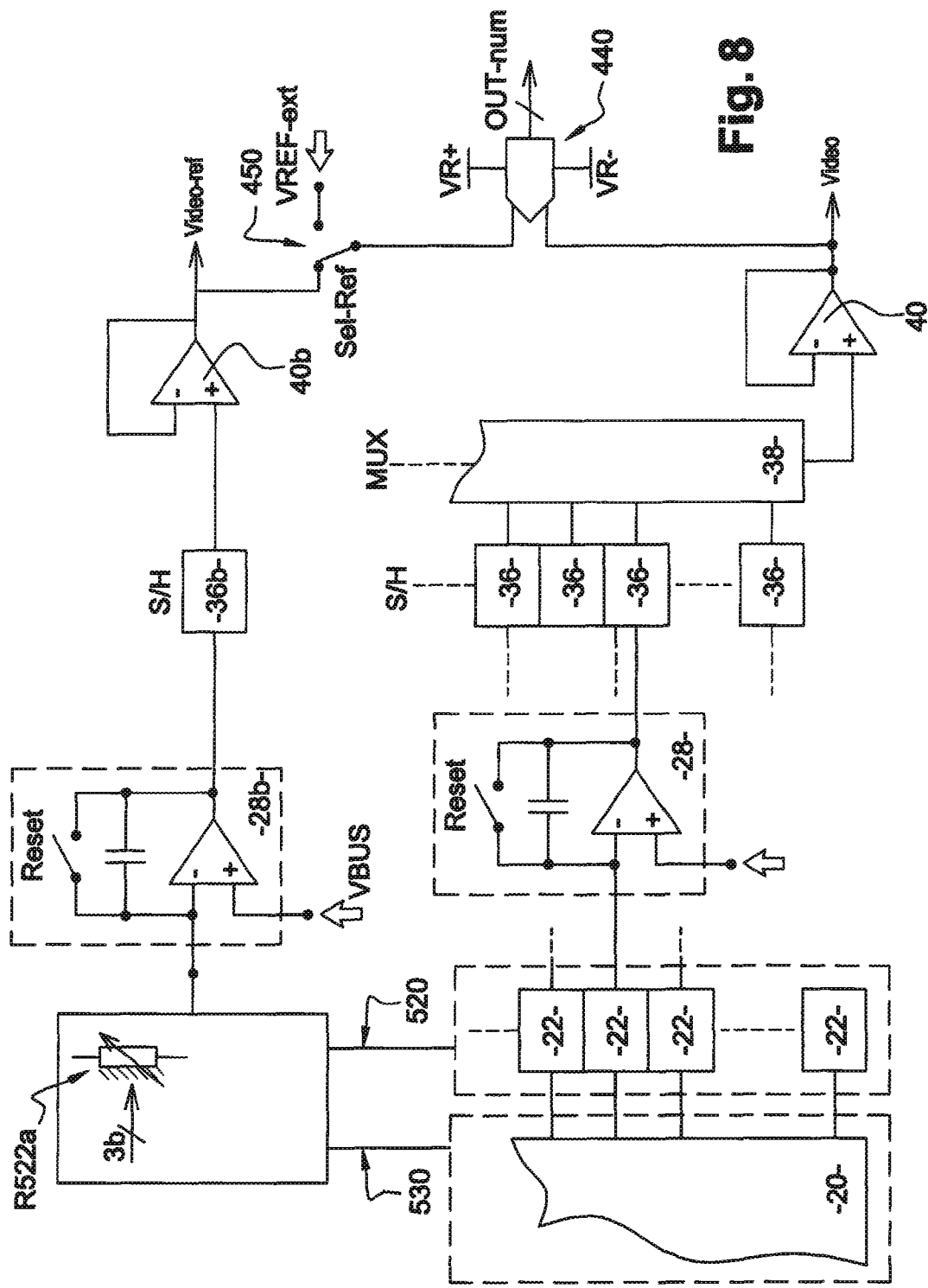
FIG. 8 is a diagram of the read circuit according to the invention in a specific implementation configuration.

A third specific embodiment of the invention based on the elements already described and capable of completing the advantages already provided by the invention is now described in relation with the diagram provided in FIG. 8. Such an embodiment comprises either a detector such as described in relation with FIG. 4, and thus comprising a control circuit 50 provided with a current branch 52, or a detector described in relation with FIG. 7 and provided with an additional branch equivalent to branch 52. The following description is based on the first mode, but can easily be transposed in case of an implementation of the second mode.

According to this third embodiment, circuit 50 is associated with a CTIA integrator 28b totally similar to the CTIA integrators 28 installed at the end of each column of the usual read circuit. Potential VBUS is applied to median point C of circuit 50 via the non-inverting input of the amplifier of integrator 28b. Integrator 28b is reset to zero after each reading of a line of array 12 of detection bolometers 16 by the same control signal Reset as integrators 28b, applied to the controllable switch of integrator 28b. The output of integrator 28b is transmitted to a video amplifier 40b, identical to video amplifier 40, via a sample-and-hold device 36b, identical to sample-and-hold devices 36 and activated in phase therewith. Amplifier 40b, for example of follower amplifier type, outputs a reference signal Video-ref corresponding to the integration of the differential current $I_{522}-I_{521}$ of half-branches 521, 522 of branch 52 previously described in relation with FIG. 4. More specifically, integrator 28b provides after integration time $T_{int}$ a signal equal to VBUS$-(I_{522}-I_{521})*T_{int}$.

This circuit is completed by a differential analog-to-digital converter (ADC) 440, for example, over 14 bits, and with a selector 450 controlled by a signal Sel-ref intended to optionally connect to the reference input of the differentia ADC either output voltage Video-ref or an independent external reference voltage VREF-ext.

For this specific embodiment, it is no longer needed to adjust average continuous level NC at the output of CTIAs 40 by means of the setting by series connection of bolometric resistor 522b. Indeed, it is sufficient to slightly modify compensation current $I_{521}$, that is, the balance of currents $I_{521}$ and $I_{522}$ in the sole branch 52 of circuit 50, by means of a setting, for example, over 3 bits, of resistor 522a. This setting is specific to this embodiment and has no particular advantage for the previously-described embodiments. Reference voltage Video-ref obtained after integration of differential current $(I_{521}-I_{522})$ by CTIA 540b is thus easily adjustable to position output OUT-num of differential ADC 440 to a desired position, for example, central, of the dynamic range of ADC 440. All the other characteristics and variations of circuit 50, such as previously discussed, are further typically identical for the third embodiment.

The other input of differential ADC 440 further sequentially receives multiplexed voltage Video originating from the reading of array 12 of bolometers 16, and differential ADC 440 outputs a digital conversion OUTnum of analog voltage difference (Video−Video-ref) or of analog voltage difference (Video−VREF-ext) according to the state of selector 450. It should be understood that the differential converter and the selection elements are advantageously provided herein as integral parts of circuit 100, but that they may as well be transferred outside of the circuit, or even outside of the system (camera) integrating such a detector.

Circuit complement 28b, 36b, 40b, 440, 450 provides various advantages, in addition to the availability of a digitized differential output signal, that is, by nature, immune to disturbances beyond the digitizing circuit, and rid of the common-mode carrying no useful signal.

First, the substantial rejection of the electric noise carried by all the external power supplies of the detector according to the invention is obtained. Indeed, the noise carried by lines VDET and VSK forms independent disturbances in currents $I_{522}$ and $I_{521}$, which are reproduced downstream in currents $I_{ac}$ and $I_{cm}$ of retina 12. Such disturbances are integrated in parallel and in time coherence by CTIAs 28 and 28b in signals Vout and Vout-ref Transferred signals Video and Video-ref at the output are finally subtracted from each other by converter 440, so that the noise of these power supplies is essentially rejected.

Further, potential VBUS is simultaneously reproduced with a unit gain in the outputs of all CTIAs 28 and 28b. The same is true for the associated disturbances (the noise on VBUS) which are simultaneously integrated in time coherence on outputs Vout and Vout-ref and are thus essentially eliminated from signal OUTnum available at the output of ADC 440.

Finally, it is no longer needed to drive the circuit by means of lines GAC and GCM, now formed according to the invention internally to the detector, so that the noise on these input points is not to be considered.

This specific arrangement is advantageous with respect to the use of a differential ADC at the output of circuit 100 according to the state of the art, since voltage VREF-ext which is necessary to be provided on one of the inputs of a differential ADC, for example, identical to ADC 440 and arranged at the output of amplifier 40 of the detector of the state of the art, is itself inevitably very sensitive to noise. The invention thus enables to have a digital output OUTnum of very good quality without it being necessary to provide such a power supply with constraining design specifications.

Analog circuits 50 for controlling the voltages of gates GAC, GCM of bias transistors 18, 26 of sensitive and compensation bolometers 16 and 24 have been described.

Of course, the invention, which comprises correlating the bias voltages together and the common-mode currents together so that they have close or even identical variations, also applies to an essentially digital control circuit.

Referring again to FIG. 3, in the digital embodiment, reference generation circuit 48 comprises an analog-to-digital converter which generates a digital value of quantity MFPT depending on the substrate temperature, as well as a digital information processing unit, for example, a DSP-type calculator, which receives the digital value of quantity MFPT and which calculates digital values of the voltage set point according to the digital value of quantity MFPT. For example, the data processing unit comprises a memory containing a table of voltage set point values according to the quantity depending on the substrate temperature and a processor which selects from this table a reference value of voltage GAC and an associated (correlated) reference value for voltage GCM according to the current digital value of quantity MFPT, or which calculates a current value of said voltage references by interpolating the values of said table. As a variation, the calculator implements calculation rules which are valid whatever the current digital value of quantity MFPT, such as for example a parameterized behavioral model, or simple algebraic relations empirically calibrated to provide the desired result. Reference generation circuit 48 also comprises a digital-to-analog converter, connected to the data processing unit and transforming the digital values of the voltage set points into analog voltage set points respectively delivered on buses 530 and 520.

The invention claimed is:

1. A bolometric detector for detecting an infrared radiation, comprising an array of detection bolometers each comprising a bolometric membrane suspended above a substrate, comprising:

associated with each of the detection bolometers:
a detection branch, comprising the detection bolometer and a bias circuit to set the voltage across said detection bolometer according to a voltage set point;
a compensation branch comprising a compensation bolometer substantially having the substrate temperature, and a bias circuit for setting the voltage across the compensation bolometer according to a voltage set point; and an integrator for generating a voltage by integrating a difference between the current flowing through the detection bolometer and the compensation bolometer, said integrator having a predetermined output electric dynamic range;

a circuit for controlling the voltage set points of the bias circuits of the detection and compensation branches, wherein the voltage set point control circuit comprises:

a circuit for generating a quantity depending on a substrate temperature, comprising:

at least one bolometer substantially having the substrate temperature; and a circuit for biasing said at least one bolometer, the biasing of said at least one bolometer generating said quantity;

a circuit for generating the voltage set points of the detection and compensation branches according to said quantity, so that, when the bolometer array is exposed to a uniform reference scene, the average of the differences between currents $I_{ac}^{mc}$ and $I_{cm}^{mc}$ flowing through the detection bolometers and the compensation bolometers, or "continuous level" is within the integrator dynamic range for a substrate temperature range between −30° C. and 90° C.

2. The bolometric detector of claim 1, wherein the circuit for generating the voltage set points generates voltage set points so that:

currents $I_{ac}^{mc}$ flowing through the detection bolometers follow in real time a law according to relation:

$$I_{ac}^{mc} = A \cdot (1 + f1(FPT))$$

currents $I_{cm}^{mc}$ flowing through the compensation bolometers follow in real time a law according to relation:

$$I_{cm}^{mc} = B \cdot (1 + f1(FPT))(1 + f2(FPT))$$

in which expressions A and B are constant predetermined parameters ƒ1(FPT) and ƒ2(FPT) are predetermined positive or zero functions of temperature FPT of the substrate, function ƒ2(FPT) being limited so that the continuous level is in the dynamic range of the integrators.

3. The bolometric detector of claim 1, wherein the circuit for generating the voltage set points generates voltage set points so that ratio $$\frac{I_{ac}^{mc}}{I_{cm}^{mc}}$$

between current $I_{ac}^{mc}$ flowing through the detection bolometers and current $I_{cm}^{mc}$ flowing through the compensation bolometers is equal to $$\frac{I_{ac}^{mc}}{I_{cm}^{mc}} = D \times (1 + f2(FPT))$$

where D is a constant predetermined parameter, and ƒ2(FPT) is a predetermined positive or zero function of temperature FPT of the substrate.

4. The bolometric detector of claim 2, wherein function ƒ2(FPT) is of the second order, particularly lower than 0.1.

5. The bolometric detector of claim 2, wherein function ƒ2(FPT) increases according to temperature FPT of the substrate.

6. The bolometric detector of claim 2, wherein function ƒ1(FPT) increases according to temperature FPT of the substrate.

7. The bolometric detector of claim 1, wherein the circuit for generating the quantity depending on the substrate temperature comprises:

a current mirror comprising a first and a second branches, each branch comprising an input and an output;

a constant current source connected to the input of the first branch of the current mirror;

a first resistor connected between the output of the first branch of the current mirror and a first constant potential, the first resistor comprising a first bolometer substantially having the substrate temperature, and having a resistance substantially identical to that of the detection bolometers, and a non-bolometric resistor series-connected with the first bolometer;

a second resistor connected between the output of the second branch of the current mirror and the first constant potential, the second resistor comprising a second bolometer, substantially identical to the first bolometer, the current flowing in the second branch of the current mirror forming said quantity; and a third resistor connected between the input of the second branch of the current mirror and a second constant potential.

8. The bolometric detector of claim 7, wherein the non-bolometric resistance of the first resistor is programmable over a range of values between 0 and 30% of the resistance value of the bolometer of the first resistor at a predetermined reference temperature.

9. The detector of claim 8, wherein the non-bolometric resistance of the first resistor is set to a specific value such that the responsivity of the detection bolometers is essentially constant over a predetermined temperature range of the substrate temperature.

10. The detector of claim 9, wherein the energy of activation of the bolometric material forming the first bolometer is close to 0.18 eV, and the value of non-bolometric resistor of the first resistor is close to 25% of the resistance value of the bolometer of the first resistor.

11. The bolometric detector of claim 1, wherein the circuit for generating the voltage set points comprises:

an analog-to-digital converter, connected to the circuit for generating said quantity, generating a digital value of said quantity;

a digital data processing unit generating digital values of the voltage set points according to the digital value of said quantity;

a digital-to-analog converter, connected to the processing unit and generating the voltage set points of the bias circuits according to the digital values of the set points.

12. A bolometric detector for detecting an infrared radiation, comprising an array of detection bolometers each comprising a bolometric membrane suspended above a substrate, comprising:

associated with each of the detection bolometers:

a detection branch, comprising the detection bolometer and a bias circuit to set the voltage across said detection bolometer according to a voltage set point;

a compensation branch comprising a compensation bolometer substantially having the substrate temperature, and a bias circuit for setting the voltage across the compensation bolometer according to a voltage set point; and an integrator for generating a voltage by integrating a difference between the current flowing through the detection bolometer and the compensation bolometer, said integrator having a predetermined output electric dynamic range;

a circuit for controlling the voltage references of the bias circuits of the detection and compensation branches, wherein the circuit for controlling the voltage set points comprises:

a circuit for generating a quantity depending on a substrate temperature, comprising:
  at least one bolometer substantially having the substrate temperature; and
  a circuit for biasing said at least one bolometer, the biasing of said at least one bolometer generating said quantity;

a circuit for generating the voltage set points of the detection and compensation branches according to said quantity, said circuit comprising:
  a current mirror comprising a first and a second branches, each branch comprising an input and an output;
  a constant current source connected to the input of the first branch of the current mirror;
  a first resistor connected between the output of the first branch of the current mirror and a first constant potential, the first resistor comprising a first bolometer substantially having the substrate temperature, and having a resistance substantially identical to that of the detection bolometers, and a non-bolometric resistor series-connected with the first bolometer;
  a second resistor connected between the output of the second branch of the current mirror and the first constant potential, the second resistor comprising a second bolometer, substantially identical to the first bolometer, the current flowing through the second branch of the current mirror forming said quantity; and
  a third resistor connected between the input of the second branch of the current mirror and a second constant potential.

13. The bolometric detector of claim 12, wherein the non-bolometric resistance of the first resistor is programmable over a range of values between 0 and 30% of the resistance value of the bolometer of the first resistor at a predetermined reference temperature.

14. The bolometric detector of claim 12, wherein the potential of the terminal of the third resistor which is not taken to the second potential, defines a voltage set point for the compensation branch biasing circuits, and the potential of the terminal of the second resistor which is not taken to the first constant potential defines a voltage set point for the detection branch biasing circuits.

15. The bolometric detector of claim 14, wherein the third resistor comprises a third bolometer substantially having the substrate temperature, and having a resistance substantially identical to that of the compensation bolometers.

16. The bolometric detector of claim 15, wherein the resistance of the third bolometer is programmable to position the continuous level within the electric dynamic range of the integrators.

17. The bolometric detector of claim 14, wherein the third resistor comprises in series with the third bolometer, a non-bolometric resistor programmable in a range from 0 to 10% of the resistance value of the third bolometer at a predetermined reference temperature.

18. The bolometric detector of claim 13:
wherein the biasing circuit of each detection branch is formed of a first MOS transistor or "TMOS", series-connected with the detection bolometer of the detection branch, between the first potential and a first current node;

wherein the biasing circuit of each compensation branch is formed of a second TMOS series-connected with the compensation bolometer of the compensation branch, between the second potential and the first current node of the detection branch associated with the compensation branch, and having a polarity opposite to that of the first TMOSs of the detection branches;

wherein the circuit for controlling the voltage set points further comprises a circuit for applying the voltage set points to the bias circuits, comprising:
  a fourth bolometer, substantially identical to the third bolometer;
  a third TMOS, substantially identical to the second TMOSs of the compensation branches and series-connected with the fourth bolometer between the second potential and a second current node;
  a fifth bolometer substantially identical to the first and second bolometers;
  a second TMOS, substantially identical to the first TMOSs of the detection branches and series-connected with the fifth bolometer between the second current node and the first potential;
  a first operational amplifier having its non-inverting terminal connected to the potential of the terminal of the third resistor which is not taken to the second potential, having its inverting terminal connected to the terminal of the fourth bolometer which is not taken to the second potential, and having it output connected to the gate of the third TMOS;
  a second operational amplifier having its non-inverting terminal connected to the potential of the terminal of the second resistor which is not taken to the first potential, having its inverting terminal connected to the terminal of the fifth bolometer which is not taken to the first potential, and having it output connected to the gate of the fourth TMOS;

wherein the gate of the second TMOS of each compensation branch is connected to the potential formed between the fourth bolometer and the third MOS transistor;

and wherein the gate of the first TMOS of each detection branch is connected to the potential between the fifth bolometer and the fourth TMOS.

19. The bolometric detector of claim 18, wherein it further comprises:
a first circuit for processing the voltage at the output of the integrator associated with the detection bolometer;
an integrator, associated with the circuit for controlling the voltage set points and identical to the integrator associated with the detection bolometer, to generate a voltage by integrating a difference between the current flowing through the fourth bolometer and the current flowing through the fifth bolometer;
a second circuit for processing the output voltage of the integrator associated with the circuit for controlling the voltage set points and identical to the first processing circuit; and
an analog-to-digital converter for converting the difference between the output voltages of the first and second processing circuits.

20. The bolometric detector of claim 14:
wherein the biasing circuit of each detection branch is formed of a first MOS transistor or "TMOS", series-connected with the detection bolometer of the detection branch, between the first potential and a first current node;

wherein the biasing circuit of each compensation branch is formed of a second TMOS series-connected with the compensation bolometer of the compensation branch, between the second potential and the first current node of the detection branch associated with the compensation branch, and having a polarity opposite to that of the first TMOSs of the detection branches;

wherein the circuit for controlling the voltage set points further comprises a circuit for applying the voltage set points to the bias circuits, comprising:

for each compensation branch, a first operational amplifier having its non-inverting terminal taken to the potential of the terminal of the third resistor which is not taken to the second potential, having its inverting terminal connected between the compensation bolometer and the second TMOS of the compensation branch, and having it output connected to the gate of the second transistor of the compensation branch;

for each detection branch, a second operational amplifier having its non-inverting terminal taken to the potential of the terminal of the third resistor which is not taken to the first potential, having its inverting terminal connected between the detection bolometer and the first TMOS of the detection branch, and having it output connected to the gate of the first TMOS of the detection branch.

* * * * *